United States Patent
Chen et al.

(10) Patent No.: US 12,382,514 B2
(45) Date of Patent: Aug. 5, 2025

(54) CHANNEL CONFLICT PROCESSING METHOD AND APPARATUS

(71) Applicant: HUAWEI TECHNOLOGIES CO., LTD., Guangdong (CN)

(72) Inventors: Yan Chen, Shanghai (CN); Le Jin, Shanghai (CN); Bingguang Peng, Shanghai (CN); Xi Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 17/706,424

(22) Filed: Mar. 28, 2022

(65) Prior Publication Data

US 2022/0225435 A1  Jul. 14, 2022

Related U.S. Application Data

(63) Continuation of application No. PCT/CN2019/109758, filed on Sep. 30, 2019.

(51) Int. Cl.
*H04W 74/0833* (2024.01)
*H04L 5/00* (2006.01)
(Continued)

(52) U.S. Cl.
CPC ....... *H04W 74/0858* (2013.01); *H04L 5/0039* (2013.01); *H04L 5/0053* (2013.01);
(Continued)

(58) Field of Classification Search
CPC ....... H04W 36/0069; H04W 36/00692; H04W 36/185; H04W 36/20; H04W 52/281;
(Continued)

(56) References Cited

U.S. PATENT DOCUMENTS

| 2016/0301515 A1 | 10/2016 | Ouchi et al. |
| 2017/0374686 A1 | 12/2017 | Agarwal et al. |

(Continued)

FOREIGN PATENT DOCUMENTS

| CN | 106134261 A | 11/2016 |
| CN | 109068390 A | 12/2018 |

(Continued)

OTHER PUBLICATIONS

Office Action in Chinese Appln. No. 201980100406.8, dated May 30, 2023, 9 pages.

(Continued)

*Primary Examiner* — Pao Sinkantarakorn
(74) *Attorney, Agent, or Firm* — Fish & Richardson P.C.

(57) ABSTRACT

The present disclosure relates to channel conflict processing methods and apparatus. In one example method, when a terminal device establishes a connection relationship with a source cell, and sends a connection request to or establishes a connection relationship with a target cell, the terminal device detects whether an uplink channel conflict occurs on an uplink channel of the source cell and an uplink channel of the target cell, where the source cell and the target cell are infra-frequency or intra-band contiguous inter-frequency. If the terminal device determines that an uplink channel conflict occurs, the terminal device sends a signal on an uplink channel with a higher priority between the uplink channel of the source cell and the uplink channel of the target cell.

20 Claims, 12 Drawing Sheets

(51) Int. Cl.
*H04W 36/18* (2009.01)
*H04W 52/36* (2009.01)
*H04W 72/566* (2023.01)

(52) U.S. Cl.
CPC ....... *H04W 36/185* (2023.05); *H04W 52/367* (2013.01); *H04W 72/569* (2023.01)

(58) Field of Classification Search
CPC ............. H04W 52/367; H04W 72/569; H04W 74/0841; H04W 74/0858
See application file for complete search history.

(56) References Cited

U.S. PATENT DOCUMENTS

| | | |
|---|---|---|
| 2019/0045529 A1 | 2/2019 | Xiong et al. |
| 2020/0245208 A1* | 7/2020 | Tsuda ................. H04W 36/08 |
| 2020/0314773 A1* | 10/2020 | Hsieh ................. H04W 52/346 |
| 2021/0037547 A1* | 2/2021 | Paladugu .......... H04W 72/1268 |
| 2021/0084546 A1* | 3/2021 | Awoniyi-Oteri ...... H04W 36/18 |
| 2022/0038985 A1* | 2/2022 | Deenoo ................. H04W 36/32 |

FOREIGN PATENT DOCUMENTS

| | | |
|---|---|---|
| CN | 109644093 A | 4/2019 |
| CN | 110199497 A | 9/2019 |
| EP | 3100533 A1 | 12/2016 |

OTHER PUBLICATIONS

Mediatek Inc et al., "UL Handling with DAPS During RUDI Handover," 3GPP TSG-RAN WG2 #107, R2-1909178, Prague, Czech Republic, Aug. 26-30, 2019, 8 pages.

Extended European Search Report in European Appln No. 19947820.7, dated Dec. 22, 2022, 13 pages.

3GPP TS 38.213 V15.7.0 (Sep. 2019), "3rd Generation Partnership Project; Technical Specification Group Radio Access Network; NR; Physical layer procedures for control(Release 15)," Sep. 2019, 108 pages.

Ericsson, "Further Consideration of UE Capabilities in Dual-Connectivity," 3GPP TSG RAN WG1 Meeting #78bis R1-144257, Ljubljana, Slovenia, Oct. 6-10, 2014, 3 pages.

Huawei, HiSilicon, "Report of [105bis#15][NR/mob enh] HO interruption solutions," 3GPP TSG RAN WG2 Meeting #106, R2-1906057, Reno, USA, May 13-17, 2019, 26 pages.

PCT International Search Report and Written Opinion issued in International Application No. PCT/CN2019/109758 on Jun. 30, 2020, 14 pages (with English translation).

\* cited by examiner

CHANNEL CONFLICT PROCESSING METHOD AND APPARATUS

CROSS-REFERENCE TO RELATED APPLICATIONS

This application is a continuation of International Application No. PCT/CN2019/109758, filed on Sep. 30, 2019. The disclosures of the aforementioned application is hereby incorporated by reference in its entirety.

TECHNICAL FIELD

This application relates to the field of communications technologies, and in particular, to a channel conflict processing method and apparatus.

BACKGROUND

Because a beam concept is introduced into new radio (new radio, NR), a beam scanning delay introduced by a high-frequency beamforming technology increases handover interruption time. In addition, a beamforming feature creates a small coverage area, and therefore reduces handover reliability. When a terminal device moves or rotates, the terminal device may experience very fast signal degradation. In addition, channel conditions between a line of sight (line of sight, LoS) and a non-line of sight (non-line of sight, NLoS) in NR differ greatly, and signal strength fluctuation between the LoS and the NLoS reaches tens of dB. This may result in more handover failures and a higher probability of ping-pong handovers. Therefore, a handover in NR is more challenging than that in a long term evolution (long term evolution, LTE) communications system.

In addition, an ultra-reliable low-latency communication (ultra-reliable low-latency communication, URLLC) service in NR requires an end-to-end delay of 1 ms in some cases. A 0-ms handover interruption is important in providing seamless service experience.

A dual active protocol stack (dual active protocol stack, DAPS) handover solution may implement the 0-ms handover interruption. In a schematic diagram of a DAPS handover process shown in FIG. 1, a source cell (source cell) sends a handover command (handover command, HO cmd) to a terminal device, the terminal device initiates access to a target cell (target cell), and then the terminal device completes the access to the target cell. In this solution, after the terminal device initiates the access, the terminal device continues to communicate with the source cell, that is, a dual-cell connection ("dual connectivity" for short) interval shown in FIG. 1. Finally, after the source cell is deleted, the terminal device communicates only in the target cell, and the handover is completed. In the handover process, the terminal device communicates in the source cell and the target cell at the same time, so that the 0-ms handover interruption is implemented.

In an intra-frequency synchronization/asynchronization scenario and an intra-band contiguous synchronization/asynchronization scenario, a radio frequency transmitting, receiving, and processing structure of the terminal device is shown in FIG. 2. A baseband processing (baseband processing, BBP) module of the source cell and a BBP module of the target cell of the terminal device are connected to a same radio frequency (radio frequency, RF) module, or a BBP channel of the source cell and a BBP channel of the target cell are connected to a same RF channel, to reduce power consumption of the terminal device.

When the BBP channels of the source cell and the target cell of the terminal device are connected to the same RF channel, the terminal device may send information to both the source cell and the target cell, and an uplink channel conflict may occur between the source cell and the target cell. How to reduce negative effects caused by the uplink channel conflict is a problem that needs to be resolved in this application.

SUMMARY

Embodiments of this application provide a channel conflict processing method and apparatus, to resolve an uplink channel conflict problem of a terminal device, and reduce a data loss caused by the uplink channel conflict problem in a process in which the terminal device accesses a communication cell.

According to a first aspect, a channel conflict processing method is provided, and the method includes:

when a terminal device establishes a connection relationship with a source cell, and sends a connection request to or establishes a connection relationship with a target cell, detecting, by the terminal device, whether an uplink channel conflict occurs, where an uplink channel includes an uplink channel of the source cell and an uplink channel of the target cell; and if the terminal device determines that an uplink channel conflict occurs, performing optimization processing on the uplink channel conflict.

In an optional example, the performing optimization processing on the uplink channel conflict includes: performing priority-based optimization processing on the uplink channel conflict.

In an optional example, the performing optimization processing on the uplink channel conflict includes:

performing priority-based dropping processing on the uplink channel conflict, where the priority-based dropping processing includes: obtaining priorities of the uplink channel of the source cell and the uplink channel of the target cell, and sending a signal on an uplink channel with a higher priority through one uplink radio frequency channel.

In an optional example, the performing optimization processing on the uplink channel conflict includes:

performing simultaneous sending processing on the uplink channel conflict, where the simultaneous sending processing includes: performing time domain superposition on a signal on the uplink channel of the source cell and a signal on the uplink channel of the target cell to obtain a superposed signal, and then sending the superposed signal through one uplink radio frequency channel.

In an optional example, before the performing simultaneous sending processing on the uplink channel conflict, the method further includes:

obtaining a first power difference between the uplink channel of the source cell and the uplink channel of the target cell through calculation; and determining that the first power difference is less than a second threshold.

In an optional example, after the determining that the first power difference is less than a second threshold, the method further includes:

separately obtaining, through calculation, an actual transmit power P_highPriority_1t of a high-priority channel when priority-based dropping processing is performed and an actual transmit power P_highPriority_2t of the high-priority channel when simultaneous sending processing is performed:

P_highPriority_1t=min(Pc max_1t, P_highPriority), and
P_highPriority_2t=min(Pc max_2t, P_highPriority), where Pc max_1t is a maximum transmit power of the terminal device when priority-base dropping processing is performed, Pc max_2t is a maximum transmit power of the terminal device when simultaneous sending processing is performed, and P_highPriority is a calculated transmit power of the high-priority channel;

obtaining a second power difference between P_highPriority_1t and P_highPriority_2t through calculation; and determining that the second power difference is less than a third threshold.

In an optional example, before the obtaining, through calculation, an actual transmit power P_highPriority_2t of the high-priority channel when simultaneous sending processing is performed, the method further includes:

determining an allocation manner of the superposed signal, where the allocation manner includes an almost contiguous allocation manner and a non-contiguous allocation manner, and the almost contiguous allocation manner is characterized by that, between a highest frequency and a lowest frequency in frequencies allocated to the source cell and the target cell, at least a ratio of an unallocated frequency band to a total frequency band is less than a first threshold; and when the allocation manner is the almost contiguous allocation manner, obtaining a first maximum power reduction MPR 1 of the radio frequency channel, and obtaining Pc max_2t through calculation based on the MPR 1, or when the allocation manner is the non-contiguous allocation manner, obtaining a second maximum power reduction MPR 2 of the radio frequency channel, and obtaining Pc max_2t through calculation based on the MPR 2.

In an optional example, the detecting whether a conflict occurs on the uplink channels of the source cell and the target cell includes:

after the terminal device initiates an access request to the target cell and before the target cell is successfully accessed, detecting whether a symbol-level conflict occurs between a random access-related channel of the target cell and a physical uplink shared channel PUSCH, a physical uplink control channel PUCCH, or a sounding reference channel SRS of the source cell, where the random access-related channel includes a physical random access channel PRACH, a PUSCH for sending an msg3, a PUCCH for feeding back an uplink msg4 ACK/NACK, or a PUCCH or a PUSCH for sending an msgA signal.

In an optional example, the detecting whether a conflict occurs on the uplink channels of the source cell and the target cell includes:

after the target cell is successfully accessed and before the terminal device disconnects from the source cell, detecting whether a symbol-level conflict occurs between a PUSCH, a PUCCH, or an SRS of the target cell and a PUSCH, a PUCCH, or an SRS of the source cell.

In an optional example, before the performing optimization processing on the uplink channel conflict, the method further includes:

obtaining a first priority between a random access-related channel of the target cell and a PUSCH, a PUCCH, or an SRS of the source cell, where the first priority includes that a priority of the random access-related channel of the target cell is higher than a priority of the PUSCH, the PUCCH, or the SRS of the source cell.

In an optional example, the method further includes:
avoiding, by the terminal device, the SRS channel of the source cell when allocating a transmit frequency band to an msg1 or an msgA on a PRACH of the target cell.

In an optional example, before the performing optimization processing on the uplink channel conflict, the method further includes:

obtaining a second priority between a PUSCH, a PUCCH, or an SRS of the target cell and a PUSCH, a PUCCH, or an SRS of the source cell, where the second priority includes at least one of the following priorities:

a priority of the SRS of the target cell is higher than priorities of all uplink channels of the source cell;

a priority of a PUCCH of the target cell for sending an uplink scheduling request SR, returning an acknowledgment signal ACK, or returning a negative acknowledgment signal if an error occurs is higher than a priority of the PUCCH or the PUSCH of the source cell;

a priority of a PUCCH of the target cell for sending an SR/ACK/ACK is higher than a priority of a PUCCH of the source cell for sending information other than an SR/ACK/NACK;

a priority of a PUSCH of the target cell for sending an SR/ACK/NACK is higher than a priority of the PUCCH or the PUSCH of the source cell;

a priority of a PUSCH of the target cell for sending information other than an SR/ACK/NACK is higher than a priority of a PUSCH of the source cell for sending information other than an SR/ACK/NACK or a PUCCH of the source cell for sending the information other than the SR/ACK/NACK;

a priority of the SRS of the source cell is higher than a priority of a PUCCH of the target cell for sending information other than an SR/ACK/NACK;

a priority of a PUCCH of the source cell for sending an SR/ACK/NACK is higher than a priority of a PUCCH of the target cell for sending information other than an SR/ACK/NACK;

a priority of a PUSCH of the source cell for sending an SR/ACK/NACK is higher than a priority of a PUCCH of the target cell for sending information other than an SR/ACK/NACK; or a priority of a PUSCH of the source cell for sending information other than an SR/ACK/NACK is higher than a priority of a PUCCH of the target cell for sending information other than an SR/ACK/NACK.

According to a second aspect, a channel conflict processing apparatus is provided, including:

a detection unit, configured to: when the terminal device establishes a connection relationship with a source cell, and sends a connection request to or establishes a connection relationship with a target cell, detect, by the terminal device, whether an uplink channel conflict occurs, where an uplink channel includes an uplink channel of the source cell and an uplink channel of the target cell; and a processing unit, configured to: if the terminal device determines that an uplink channel conflict occurs, perform optimization processing on the uplink channel conflict.

In an optional example, the processing unit is specifically configured to perform priority-based optimization processing on the uplink channel conflict.

In an optional example, the processing unit is specifically configured to:

perform priority-based dropping processing on the uplink channel conflict, where the priority-based dropping processing includes: obtaining priorities of the uplink channel of the source cell and the uplink channel of the target cell, and sending a signal on an uplink channel with a higher priority through one uplink radio frequency channel.

In an optional example, the processing unit is specifically configured to:

perform simultaneous sending processing on the uplink channel conflict, where the simultaneous sending processing includes: performing time domain superposition on a signal on the uplink channel of the source cell and a signal on the uplink channel of the target cell to obtain a superposed signal, and then sending the superposed signal through one uplink radio frequency channel.

In an optional example, the apparatus further includes a power calculation unit, configured to:

obtain, through calculation, a first power difference between the uplink channel of the source cell and the uplink channel of the target cell before simultaneous sending processing is performed on the uplink channel conflict; and determine that the first power difference is less than a second threshold.

In an optional example, after determining that the first power difference is less than the second threshold, the power calculation unit is further configured to:

separately obtain, through calculation, an actual transmit power P_highPriority_1t of a high-priority channel when priority-based dropping processing is performed and an actual transmit power P_highPriority_2t of the high-priority channel when simultaneous sending processing is performed:

P_highPriority_1t=min(Pc max_1t, P_highPriority), and
P_highPriority_2t=min(Pc max_2t, P_highPriority), where Pc max_1t is a maximum transmit power of the terminal device when priority-based dropping processing is performed, Pc max_2t is a maximum transmit power of the terminal device when simultaneous sending processing is performed, and P_highPriority is a theoretical transmit power of the high-priority channel;

obtain a second power difference between P_highPriority_1t and P_highPriority_2t through calculation; and determine that the second power difference is less than a third threshold.

In an optional example, before obtaining, through calculation, the actual transmit power P_highPriority_2t of the high-priority channel when simultaneous sending processing is performed, the power calculation unit is further configured to:

determine an allocation manner of the superposed signal, where the allocation manner includes an almost contiguous allocation manner and a non-contiguous allocation manner, and the almost contiguous allocation manner is characterized by that, between a highest frequency and a lowest frequency in frequencies allocated to the source cell and the target cell, at least a ratio of an unallocated frequency band to a total frequency band is less than a first threshold; and when the allocation manner is the almost contiguous allocation manner, obtain a first maximum power reduction MPR 1 of the radio frequency channel, and obtain Pc max_2t through calculation based on the MPR 1, or when the allocation manner is the non-contiguous allocation manner, obtain a second maximum power reduction MPR 2 of the radio frequency channel, and obtain Pc max_2t through calculation based on the MPR 2.

In an optional example, the detection unit is specifically configured to:

after the terminal device initiates an access request to the target cell and before the target cell is successfully accessed, detect whether a symbol-level conflict occurs between a random access-related channel of the target cell and a physical uplink shared channel PUSCH, a physical uplink control channel PUCCH, or a sounding reference channel SRS of the source cell, where the random access-related channel includes a physical random access channel PRACH, a PUSCH for sending an msg3, a PUCCH for feeding back an uplink msg4 ACK/NACK, or a PUCCH or a PUSCH for sending an msgA signal.

In an optional example, the detection unit is specifically configured to:

after the target cell is successfully accessed and before the terminal device disconnects from the source cell, detect whether a symbol-level conflict occurs between a PUSCH, a PUCCH, or an SRS of the target cell and a PUSCH, a PUCCH, or an SRS of the source cell.

In an optional example, before performing priority-based optimization processing on the uplink channel conflict, the processing unit is further configured to:

obtain a first priority between a random access-related channel of the target cell and a PUSCH, a PUCCH, or an SRS of the source cell, where the first priority includes that a priority of the random access-related channel of the target cell is higher than a priority of the PUSCH, the PUCCH, or the SRS of the source cell.

In an optional example, the processing unit is further configured to:

avoid the SRS channel of the source cell when allocating a transmit frequency band to an msg1 or an msgA on a PRACH of the target cell.

In an optional example, before performing priority-based optimization processing on the uplink channel conflict, the processing unit is further configured to:

obtain a second priority between a PUSCH, a PUCCH, or an SRS of the target cell and a PUSCH, a PUCCH, or an SRS of the source cell, where the second priority includes at least one of the following priorities:

a priority of the SRS of the target cell is higher than priorities of all uplink channels of the source cell;

a priority of a PUCCH of the target cell for sending an uplink scheduling request SR, returning an acknowledgment signal ACK, or returning a negative acknowledgment signal if an error occurs is higher than a priority of the PUCCH or the PUSCH of the source cell;

a priority of a PUCCH of the target cell for sending an SR/ACK/ACK is higher than a priority of a PUCCH of the source cell for sending information other than an SR/ACK/NACK;

a priority of a PUSCH of the target cell for sending an SR/ACK/NACK is higher than a priority of the PUCCH or the PUSCH of the source cell;

a priority of a PUSCH of the target cell for sending information other than an SR/ACK/NACK is higher than a priority of a PUSCH of the source cell for sending information other than an SR/ACK/NACK or a PUCCH of the source cell for sending the information other than the SR/ACK/NACK;

a priority of the SRS of the source cell is higher than a priority of a PUCCH of the target cell for sending information other than an SR/ACK/NACK;

a priority of a PUCCH of the source cell for sending an SR/ACK/NACK is higher than a priority of a PUCCH of the target cell for sending information other than an SR/ACK/NACK;

a priority of a PUSCH of the source cell for sending an SR/ACK/NACK is higher than a priority of a PUCCH of the target cell for sending information other than an SR/ACK/NACK; or a priority of a PUSCH of the source cell for sending information other than an SR/ACK/NACK is higher than a priority of a PUCCH of the target cell for sending information other than an SR/ACK/NACK.

According to a third aspect, an embodiment of this application provides an apparatus, including:

a memory storing executable program code; and a processor coupled to the memory.

The processor invokes the executable program code stored in the memory, so that the apparatus is enabled to perform the method according to any one of the first aspect.

According to a fourth aspect, an embodiment of this application provides a computer-readable storage medium. The computer storage medium includes program instructions, and when the program instructions are run on a computer, the computer is enabled to perform any method according to the first aspect.

It can be learned that, in embodiments of this application, when a terminal device establishes a connection relationship with a source cell, and sends a connection request to or establishes a connection relationship with a target cell, the terminal device detects whether an uplink channel conflict occurs, where an uplink channel includes an uplink channel of the source cell and an uplink channel of the target cell; and if the terminal device determines that an uplink channel conflict occurs, the terminal device performs optimization processing on the uplink channel conflict. In this process, because the terminal device initiates a connection to another cell while establishing a connection to a cell, or is simultaneously connected to two cells, a conflict may occur between uplink channels. The terminal device detects the conflict and resolves the conflict, to reduce an information loss of the uplink channels, and improve efficiency of sending information on the uplink channels.

BRIEF DESCRIPTION OF DRAWINGS

To describe the technical solutions in embodiments of this application or the conventional technology more clearly, the following briefly describes the accompanying drawings for describing the embodiments.

DESCRIPTION OF EMBODIMENTS

The following describes the technical solutions in embodiments of this application with reference to the accompanying drawings in embodiments of this application.

A terminal device in embodiments of this application may include a handheld device, a vehicle-mounted device, a wearable device, or a computing device that provides a radio communication function; another processing device connected to a wireless modem; or user equipment (user equipment, terminal device) in various forms, including a mobile station (mobile station, MS), a terminal device (terminal device), and the like. For ease of description, the devices mentioned above are collectively referred to as terminal devices.

Figure 3:
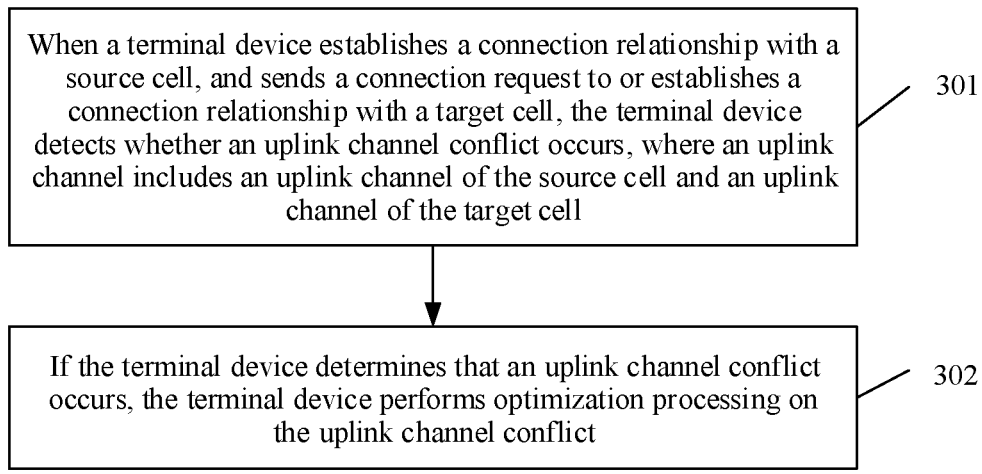
FIG. 3 is a schematic flowchart of a channel conflict processing method according to an embodiment of this application.

Based on the problem described in the background, FIG. 3 is a schematic flowchart of a channel conflict processing method according to an embodiment of the present invention. As shown in FIG. 3, the method includes the following steps.

301: When a terminal device establishes a connection relationship with a source cell, and sends a connection request to or establishes a connection relationship with a target cell, the terminal device detects whether an uplink channel conflict occurs, where an uplink channel includes an uplink channel of the source cell and an uplink channel of the target cell.

Figure 1:
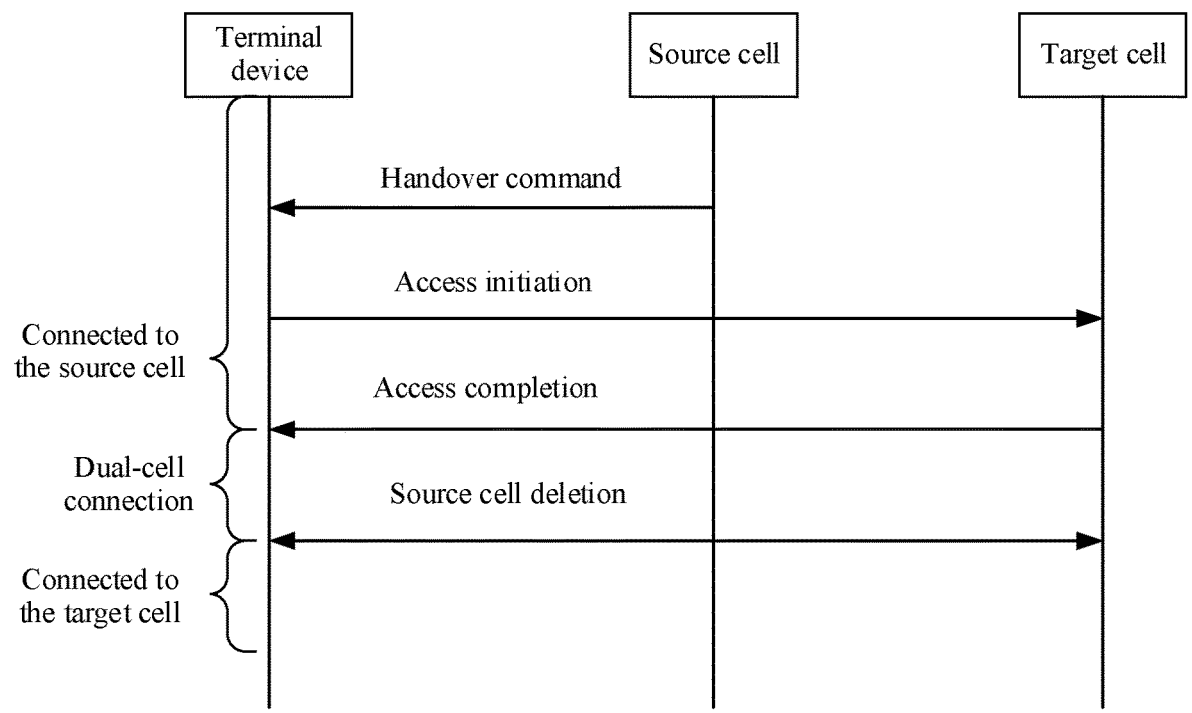
FIG. 1 is a schematic flowchart of a dual active protocol stack handover according to an embodiment of this application.

A DAPS corresponds to a scenario intended to implement a 0-ms handover. In this scenario, the source cell is a communication cell to which the terminal device establishes a connection, and the target cell is another communication cell to which the terminal device is expected to be handed over. A specific process is shown in FIG. 1. If the terminal device is disconnected from the source cell starting from a handover command shown in the figure, until a handover is completed and a new connection is established to the target cell, communication of the terminal device is interrupted for at least 50 ms. However, in a DAPS-based handover, after the handover command, the terminal device continues to communicate with the source cell, and establishes the connection to the target cell after completing access to the target cell. An interval in which the terminal device simultaneously communicates in the two cells is a dual-cell connection interval in the figure. Finally, after the source cell is deleted, the terminal device communicates only in the target cell, and the handover is completed.

In another scenario, the source cell is a communication cell to which the terminal device establishes a connection, and the target cell may be a communication cell to which the terminal device attempts to establish a connection or a communication cell to which the terminal device has been connected.

In the foregoing connection scenario, a DAPS handover scenario is used as an example, and a network formed by the target cell and the source cell includes the following scenarios:

intra-frequency (Intra-freq) synchronization;
intra-frequency (Intra-freq) asynchronization;
intra-band contiguous inter-frequency (intra-band, inter-freq) synchronization;
intra-band contiguous inter-frequency (intra-band, inter-freq) asynchronization;
intra-band non-contiguous inter-frequency (intra-band, inter-freq) synchronization;
intra-band non-contiguous inter-frequency (intra-band, inter-freq) asynchronization;
inter-band inter-frequency (inter-band, inter-freq) synchronization; and
inter-band inter-frequency (inter-band, inter-freq) asynchronization.

To implement the DAPS-based handover, the terminal device needs to simultaneously process signal sending and receiving of the two cells. Therefore, two sets of transceiver processing apparatuses are required, and each set of apparatuses includes a radio frequency (RF) processing apparatus and a baseband processing (BBP) apparatus. To reduce power consumption, two sets of transceiver processing apparatuses in an intra-frequency scenario and an intra-band contiguous scenario may share one set of radio frequency (RF) processing apparatus.

In these scenarios, a correspondence between quantities of radio frequency (RF) processing apparatuses and baseband processing (BBP) apparatuses that are required by the terminal device is shown in Table 1.

TABLE 1

| Scenario | Baseband processing (BBP) apparatus | Radio frequency (RF) processing apparatus |
| --- | --- | --- |
| Intra-frequency synchronization | 2 | 1 |
| Intra-frequency asynchronization | 2 | 1 |
| Intra-band contiguous inter-frequency synchronization | 2 | 1 |
| Intra-band contiguous inter-frequency asynchronization | 2 | 1 |
| Intra-band non-contiguous synchronization | 2 | 2 |
| Intra-band non-contiguous asynchronization | 2 | 2 |
| Inter-band synchronization | 2 | 2 |
| Inter-band asynchronization | 2 | 2 |

Figure 2:
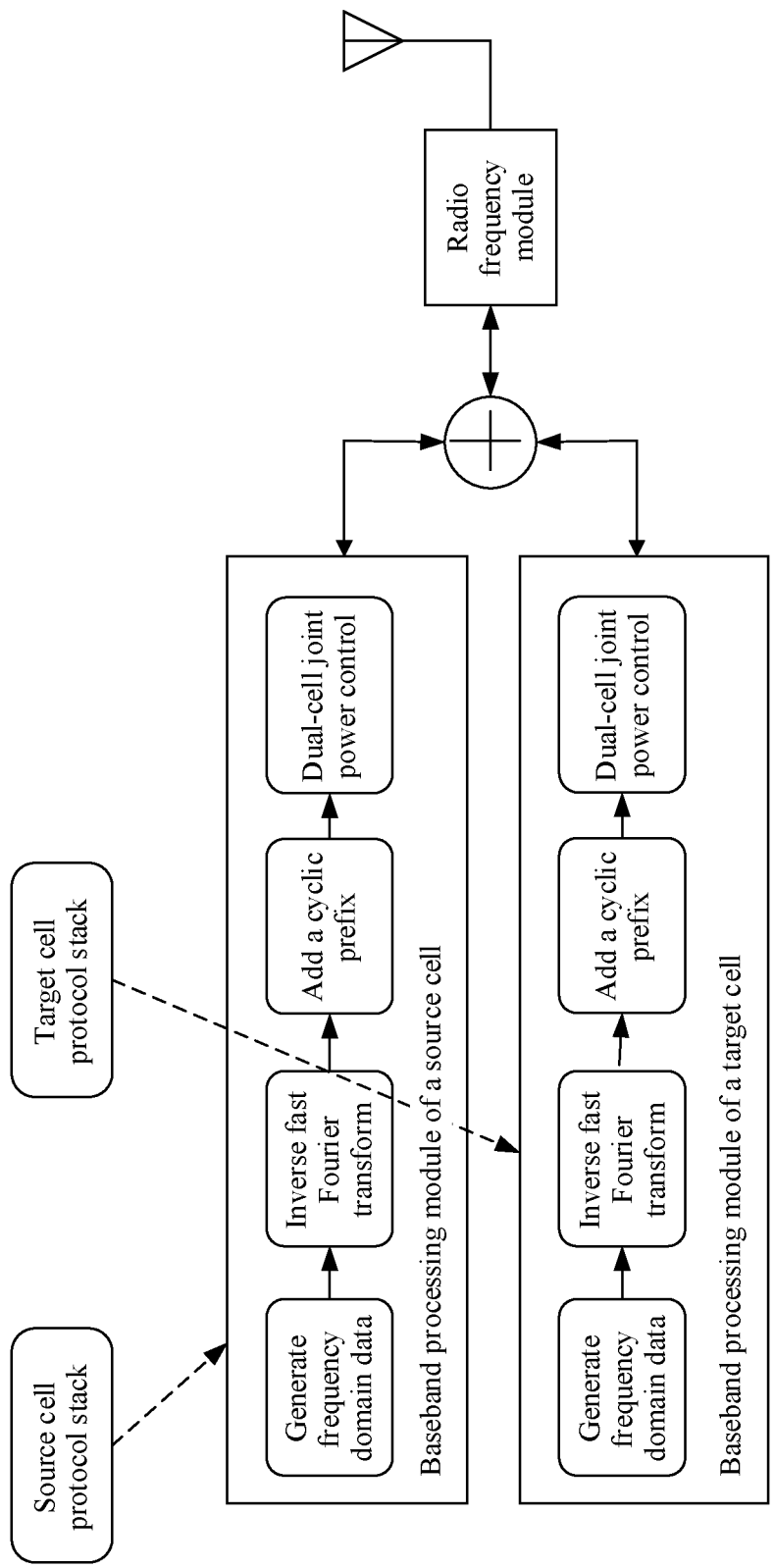
FIG. 2 is a schematic diagram of a structure for radio frequency transmitting, receiving, and processing of a terminal device according to an embodiment of this application.

In intra-band non-contiguous synchronization/asynchronization and inter-band synchronization/asynchronization scenarios, two BBP channels correspond to two RF channels, and no uplink channel conflict occurs. In intra-frequency synchronization/asynchronization and intra-band contiguous inter-frequency synchronization/asynchronization scenarios, two BBP channels correspond to one RF channel. A radio frequency transmitting, receiving, and processing structure of the terminal device is shown in FIG. 2, and an uplink transmit channel conflict may occur between the source cell and the target cell.

Optionally, detecting whether an uplink channel conflict occurs between the source cell and the target cell includes: after the terminal device initiates an access request to the target cell and before the target cell is successfully accessed, detecting whether a symbol-level conflict occurs between a random access-related channel of the target cell and a physical uplink shared channel PUSCH, a physical uplink control channel PUCCH, or a sounding reference channel SRS of the source cell. The random access-related channel includes a physical random access channel PRACH, a PUSCH channel for sending an msg3, a PUCCH for feeding back an uplink msg4 ACK/NACK, or PUCCH and PUSCH channels for sending an msgA signal.

Optionally, detecting whether an uplink channel conflict occurs between the source cell and the target cell includes: after the target cell is successfully accessed and before the terminal device disconnects from the source cell, detecting whether a symbol-level conflict occurs between a PUSCH, a PUCCH, or an SRS of the target cell and the PUSCH, the PUCCH, or the SRS of the source cell.

The uplink channel conflict indicated in embodiments of this application is a symbol-level conflict, and the symbol-level conflict means that uplink sending of two cells overlaps in time domain. If there is no symbol-level conflict, information on different uplink channels can be transmitted through time division multiplexing.

Figure 4:
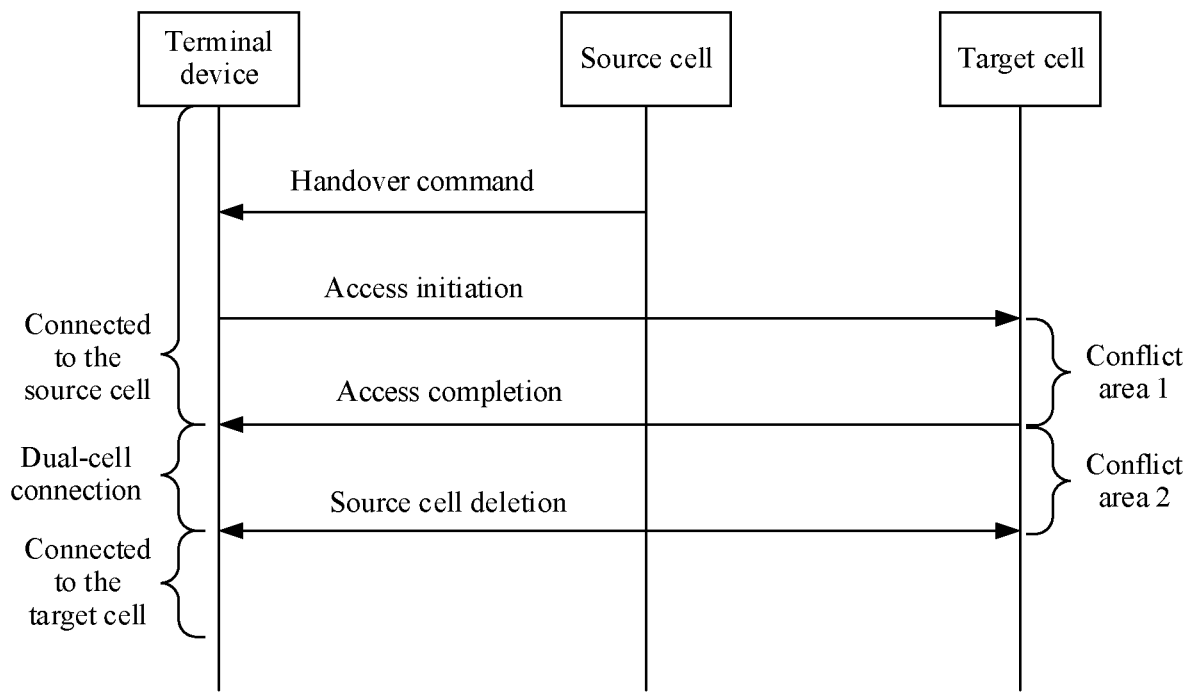
FIG. 4 is a schematic diagram of an uplink channel conflict area according to an embodiment of this application.

The uplink channel conflict between the target cell and the source cell may occur in a phase between the handover command and the source cell deletion in FIG. 1. FIG. 4 is a schematic diagram of an uplink channel conflict area according to an embodiment of this application. As shown in FIG. 4, a phase between the handover command and handover completion corresponds to a conflict area 1, and a phase between the handover completion and the source cell deletion corresponds to a conflict area 2. In the conflict area 1, the terminal device sends a random access request to the target cell, and in the conflict area 2, the terminal device is connected to and performs signal transmission with both the target cell and the source cell. Signals transmitted in the two processes are different, and uplink channels between which a conflict occurs are accordingly different.

Specifically, in the conflict area 1, the terminal device requests random access to the target cell. A random access (random access, RA) process is a process in which the terminal device requests access to a system and receives a response from the system, and the system allocates an access channel. Generally, data transmission needs to be performed after the random access succeeds. During the random access, a physical random access channel (physical random access channel, PRACH) resource needs to be selected. HO random access is generally non-contention-based random access, and may alternatively be contention-based random access when random access preamble (preamble) resources are insufficient. There are two contention-based random access manners: a conventional 4-step manner, and a 2-step manner to be added in the r16 protocol.

Figure 5A:
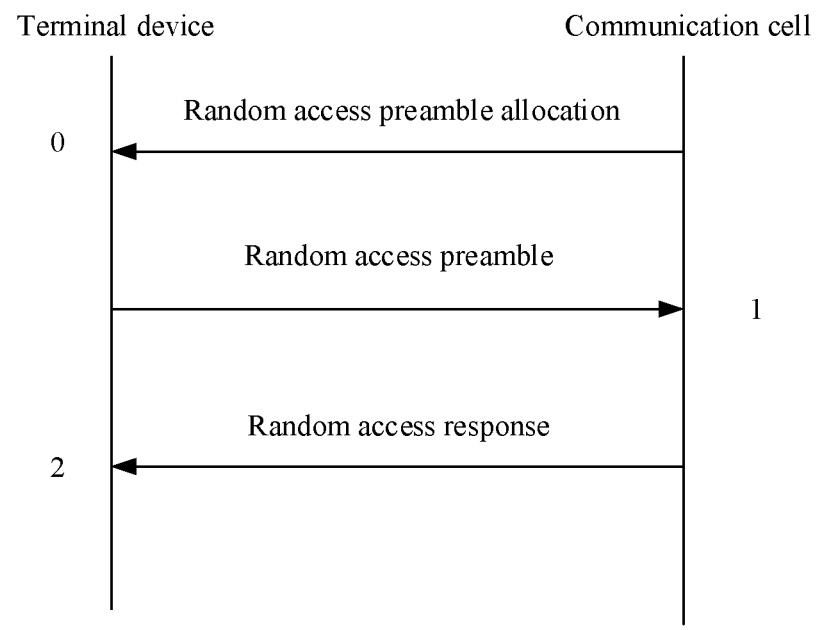
FIG. 5A is a schematic diagram of a non-contention-based random access process according to an embodiment of this application.
Figure 5B:
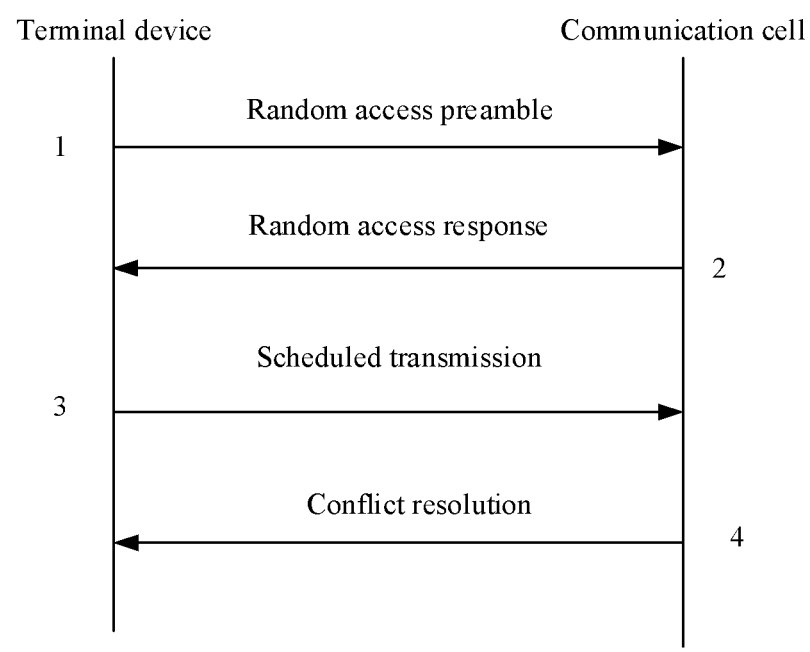
FIG. 5B is a schematic diagram of a 4-step contention-based random access process according to an embodiment of this application.
Figure 5C:
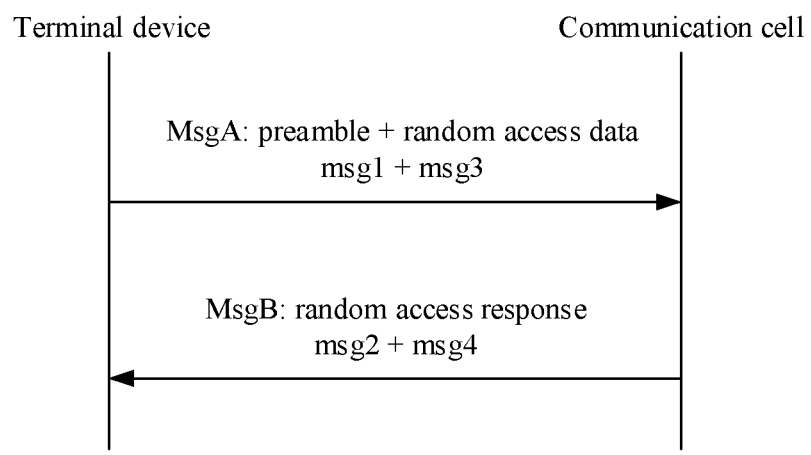
FIG. 5C is a schematic diagram of a 2-step contention-based random access process according to an embodiment of this application.

For a non-contention-based random access process, a 4-step contention-based random access process, and a 2-step contention-based random access process, refer to FIG. 5A to FIG. 5C. As shown in schematic diagrams of the random access processes shown in FIG. 5A to FIG. 5C, uplink signals include a "random access preamble (Random Access Preamble)" for non-contention-based random access, namely, a message 1 (message 1, msg1), whose corresponding channel is a PRACH; an msg1 for 4-step contention-based random access, whose corresponding channel is a PRACH; "scheduled transmission (Scheduled Transmission)", namely, an msg3, whose corresponding channel is a PUSCH; a returned acknowledgment signal or a negative acknowledgment signal returned if an error occurs (ACK/NACK) that is fed back for "contention resolution (Contention Resolution)", namely, an msg4, whose corresponding channel is a PUCCH; and an msgA, whose corresponding channels are PUCCH and PUSCH channels. These channels are collectively referred to as random access-related channels. In a process of requesting the random access to the target cell, the terminal device maintains the connection to the source cell, uploads control information and service data by using the PUSCH of the source cell, transmits uplink control information by using the PUCCH, and performs uplink channel quality estimation and related parameter measurement by using the SRS. Therefore, the random access-related channel of the target cell may conflict with the PUCCH/PUSCH/SRS channels of the source cell.

In the conflict area 2, the terminal device maintains the connections to both the target cell and the source cell. In this case, the terminal device simultaneously uploads the control information and the service data to the two cells by using the PUSCHs, transmits performance control information by using the PUCCHs, and performs uplink channel quality estimation and related parameter measurement by using the SRSs. Therefore, the PUSCH, the PUCCH, or the SRS of the target cell may conflict with the PUSCH, the PUCCH, or the SRS of the source cell. The foregoing describes uplink channel conflicts that may occur in a process of sending signals in the conflict area 1 and the conflict area 2. In this case, synchronous sending and asynchronous sending of the signals also affect the channel conflicts. In a synchronization scenario, frame boundary start time of different cells is synchronously aligned. Generally, frame boundary start time of different cells on a time division duplexing (time division duplexing, TDD) network are synchronous. In an asynchronization scenario, frame boundary start time of different cells is not aligned. Generally, frame boundary start time of different cells on a frequency division duplexing (frequency division duplexing, FDD) network are asynchronous. On the TDD network in the synchronization scenario, SRS channels are usually configured in S subframes, and the SRS channels are transmitted periodically. In the DAPS handover process, when the source cell requests the handover to the target cell, if the source cell informs the target cell of SRS configuration information of the source cell, the SRS configured for the target cell can avoid the SRS channel of the source cell.

Therefore, differences between a synchronous channel conflict and an asynchronous channel conflict are as follows:

1. In the asynchronization (usually FDD asynchronization) scenario, a probability that the SRS conflicts with another channel is higher.

2. In the synchronization scenario, the SRS generally does not conflict with another channel. In an FDD synchronization scenario, the SRS may conflict with another channel.

Based on the foregoing descriptions, the uplink channel conflicts that may occur in the conflict area 1 and the conflict area 2 are shown in Table 2.

TABLE 2

| Scenario | BBP channel | RF channel | Conflict in the conflict area 1 | Conflict in the conflict area 2 |
|---|---|---|---|---|
| Intra-frequency synchronization | 2 | 1 | Between the random access-related channel of the target cell and the PUSCH/PUCCH of the source cell | Between the PUCCH/PUSCH/SRS of the target cell and the PUCCH/PUSCH/SRS of the source cell |
| Intra-frequency asynchronization | 2 | 1 | Between the random access-related channel of the target cell and the PUSCH/PUCCH/SRS of the source cell | Between the PUCCH/PUSCH/SRS of the target cell and the PUCCH/PUSCH/SRS of the source cell |
| Intra-band contiguous inter-frequency synchronization | 2 | 1 | Between the random access-related channel of the target cell and the PUSCH/PUCCH of the source cell | Between the PUCCH/PUSCH/SRS of the target cell and the PUCCH/PUSCH/SRS of the source cell |
| Intra-band contiguous inter-frequency asynchronization | 2 | 1 | Between the random access-related channel of the target cell and the PUSCH/PUCCH/SRS of the source cell | Between the PUCCH/PUSCH/SRS of the target cell and the PUCCH/PUSCH/SRS of the source cell |

302: If the terminal device determines that an uplink channel conflict occurs, the terminal device performs optimization processing on the uplink channel conflict.

A conflict occurs between the uplink channels between the terminal device and the source cell and between the terminal device and the target cell, and optimization processing needs to be performed.

Optionally, performing optimization processing on the uplink channel conflict includes: performing priority-based optimization processing on the uplink channel conflict.

Generally, when the terminal device performs a communication cell handover or simultaneously establishes connections to two cells, importance of communication information of the two cells is different. In this case, when an uplink channel conflict occurs, the uplink channel conflict may be processed based on a priority. To be specific, it is preferentially ensured that information on a high-priority uplink channel is sent, and then information sent on a low-priority uplink channel is considered.

Optionally, the performing priority-based optimization processing on the uplink channel conflict includes: performing priority-based dropping processing on the uplink channel conflict, where the priority-based dropping processing includes: obtaining priorities of the uplink channel of the source cell and the uplink channel of the target cell, and sending a signal on an uplink channel with a higher priority through one uplink radio frequency channel.

The performing priority-based dropping processing on the uplink channel conflict is as follows: Priorities of uplink channels of the source cell and the target cell are set. When two uplink channels with different priorities conflict, information sent on a channel with a higher priority is transmitted through a radio frequency channel, and information sent on an uplink channel with a lower priority is dropped.

Optionally, before priority-based optimization processing is performed on the uplink channel conflict, the method further includes: obtaining a first priority, which specifically includes: obtaining a first priority between the random access-related channel of the target cell and the PUSCH, the PUCCH, or the SRS of the source cell, where the first priority is that the random access-related channel of the target cell>the PUSCH, the PUCCH, or the SRS of the source cell, and > indicates a higher priority.

When priority-based dropping processing is used, division of priorities of uplink channels needs to be determined first. Based on the foregoing descriptions, it can be learned that in the conflict area 1, the random access-related channel of the target cell may conflict with the PUCCH/PUSCH/SRS channels of the source cell. The SRS is an uplink sounding reference signal. In NR, functions of the SRS channel include uplink channel sounding, supporting uplink non-codebook transmission, uplink beam management, downlink beamforming, and carrier switching. Dropping the SRS channel may lead to serious consequences such as deterioration of scheduling performance of a base station. Therefore, the SRS channel has a higher priority.

Specifically, priorities of the random access-related channel and the PUCCH/PUSCH/SRS channels are set as follows:

A. Synchronization Scenario

It can be learned from the foregoing descriptions that, in the synchronization scenario, the terminal device may effectively avoid a conflict between the SRS of the source cell and the random access-related channel of the target cell based on the obtained SRS configuration parameter of the source cell. Therefore, there is no need to consider the priorities of the SRS of the source cell and the random access-related channel of the target cell. The priorities of the PUSCH/PUCCH of the source cell are lower than the priority of the random access-related channel of the target cell. Therefore, a priority relationship is set as follows:

the random access-related channel of the target cell>the PUS CH/PUCCH of the source cell.

The greater than symbol indicates a higher priority, that is, the priority of the random access-related channel of the target cell is higher than the priority of the PUSCH or the PUCCH of the source cell.

B. Asynchronization Scenario

In the asynchronization scenario, because the frame boundary start time of different cells is not aligned, the random access-related channel of the target cell may conflict with the PUSCH/PUCCH/SRS channels of the source cell. The base station evaluates uplink and downlink channel quality based on the SRS channel, and dropping the SRS channel may lead to serious consequences such as the deterioration of the scheduling performance of the base station. Therefore, the SRS channel of the source cell has a higher priority, and the following rules may be used:

1. The SRS channel of the source cell is avoided when sending resources are selected for the msg1 and the msgA of the target cell.

2. A priority of the msg3 of the target cell is higher than the priorities of the PUCCH/PUSCH/SRS of the source cell.

When the sending resources are selected for the msg1 and the msgA of the target cell, the terminal device may also obtain the SRS configuration parameter, to effectively avoid the SRS channel. However, when a sending resource is selected for the msg3 of the target cell, a priority of the resource for sending the msg3 of the target cell is higher than the priority of the PUCCH, the PUSCH, or the SRS of the source cell. A reason is that a unique identifier of the terminal device is included in the msg3, to contend for an access resource of the target cell. Therefore, the msg3 is of higher importance.

Alternatively, based on a consideration of reducing an access delay in the target cell, in another embodiment, it may be directly considered that the priority of the random access-related channel of the target cell is higher than the priorities of the PUCCH/PUSCH/SRS of the source cell.

Figure 6:
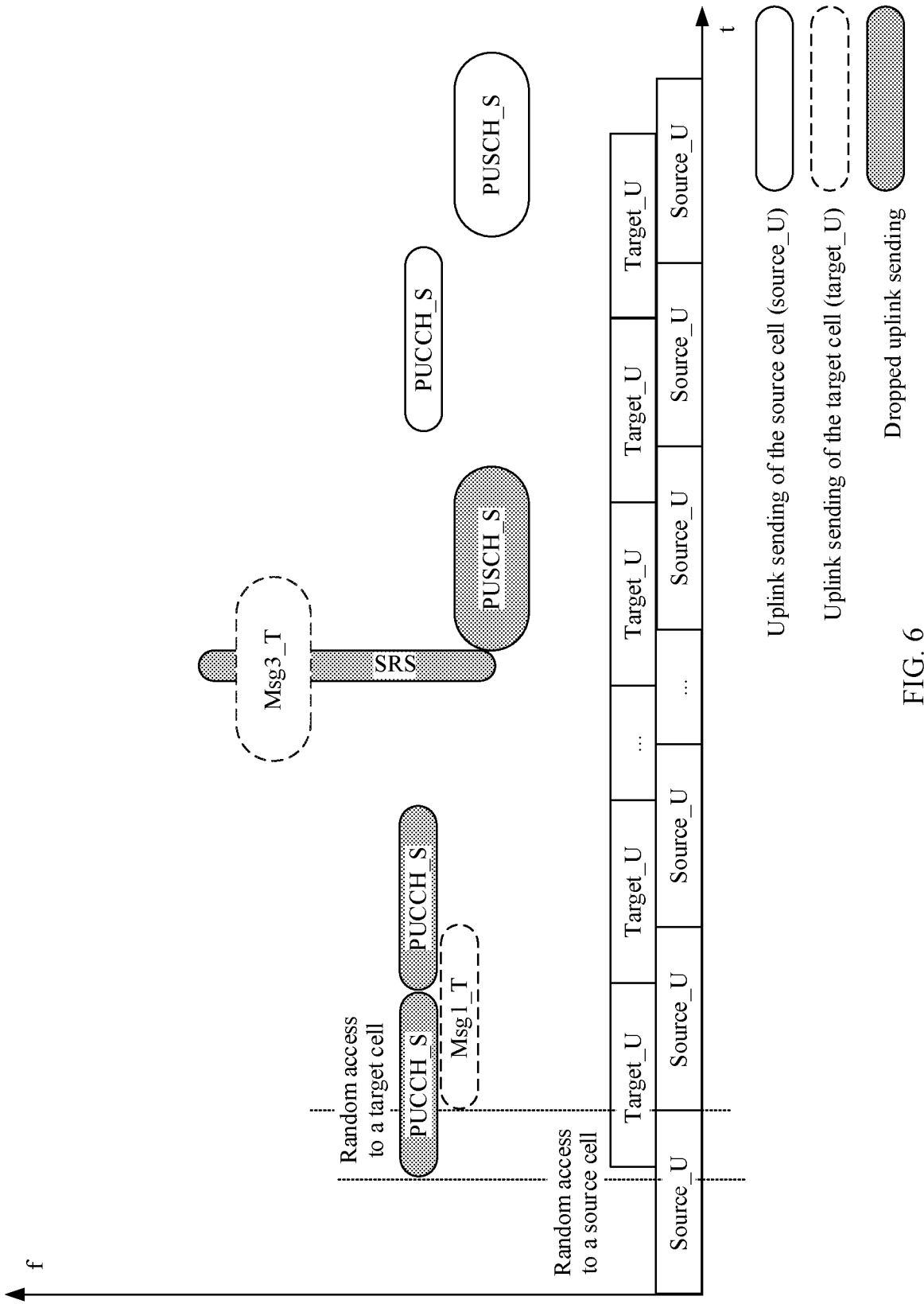
FIG. 6 is a schematic diagram of an uplink channel conflict in a conflict area 1 in an asynchronization scenario according to an embodiment of this application.

FIG. 6 is a schematic diagram of an uplink channel conflict in the conflict area 1 in the asynchronization scenario according to an embodiment of this application. As shown in FIG. 6, a user terminal is connected to the source cell and sends signals by using the uplink channels, namely, the PUCCH, the PUSCH, and the SRS, and is connected to the target cell and sends the msg1 and the msg3 by using the random access-related channel. When the msg1 conflicts with the PUCCH, the msg1 has a higher priority, so that the msg1 is sent by using a radio frequency channel, and information in the PUCCH is dropped. Similarly, when the msg3 conflicts with the SRS channel, the msg3 has a higher priority, so that the msg3 is sent by using a radio frequency channel, and information in the SRS is dropped.

In the conflict area 2 phase, uplink channels of the source cell and the target cell are PUSCH/PUCCH/SRS channels, which may conflict with each other. Details are shown in Table 3:

TABLE 3

| Scenario | Channels that may conflict in the target cell | Channels that may conflict in the source cell |
| --- | --- | --- |
| TDD synchronization | PUSCH/PUCCH | PUSCH/PUCCH |
| FDD synchronization | PUSCH/PUCCH/SRS | PUSCH/PUCCH/SRS |
| FDD asynchronization | PUSCH/PUCCH/SRS | PUSCH/PUCCH/SRS |

Similarly, in the TDD synchronization scenario, the terminal device may effectively avoid all SRS-related conflicts based on the obtained SRS configuration parameter of the source cell. Therefore, there is no need to consider the priorities of the SRS channel and another channel. In the FDD synchronization and FDD asynchronization scenarios, the PUSCHs, PUCCHs, or SRSs of the source cell and the target cell may conflict with each other. The PUCCH is mainly used to transmit an uplink scheduling request (scheduling request, SR), an ACK/NACK, aperiodic channel state information (Aperiodic Channel State Information, A-CSI), or periodic channel state information (Periodic Channel State Information, P-CSI). The SR is used to apply for an uplink grant, and the ACK/NACK is used to feed back PDSCH demodulation information. If the SR and the ACK/NACK cannot be transmitted in time, link performance is directly affected. Therefore, priorities of the SR and the ACK/NACK>a priority of the A-CSI>a priority of the P-CSI. For simplified discussion, there are two types of PUCCHs: a PUCCH for uploading SR/ACK/NACK information, which is denoted as a PUCCH with SR/ACK/

NACK; and a PUCCH for uploading information other than the SR/ACK/NACK, which is denoted as a PUCCH without SR/ACK/NACK. The former has a higher priority than the latter.

The PUSCH is mainly used to transmit an uplink data packet. The PUCCH and the PUSCH may be associated with each other, that is, the PUCCH is combined with the PUSCH for transmission. Therefore, there may also be two types of PUSCHs: a PUSCH with ACK/NACK, and a PUSCH without ACK/NACK. Similarly, the former has a higher priority than the latter.

In the DAPS handover scenario, if the terminal device successfully accesses the target cell, an uplink data service is sent in only one cell, for example, may be sent on the PUSCH of the target cell. However, in the source cell, there is a control PDU (control data packet) at a database connection pool (Database connection pool, DBCP) layer, and therefore there is still a PUSCH. Specifically, channel conflicts that may occur between the target cell and the source cell is shown in Table 4.

TABLE 4

| Number | Target cell | Source cell |
|---|---|---|
| 1 | SRS | SRS |
| 2 | SRS | PUCCH with SR/ACK/NACK |
| 3 | SRS | PUCCH without SR/ACK/NACK |
| 4 | SRS | PUSCH with ACK/NACK |
| 5 | SRS | PUSCH without ACK/NACK |
| 6 | PUCCH with SR/ACK/NACK | SRS |
| 7 | PUCCH with SR/ACK/NACK | PUCCH with SR/ACK/NACK |
| 8 | PUCCH with SR/ACK/NACK | PUCCH without SR/ACK/NACK |
| 9 | PUCCH with SR/ACK/NACK | PUSCH with ACK/NACK |
| 10 | PUCCH with SR/ACK/NACK | PUSCH without ACK/NACK |
| 11 | PUCCH without SR/ACK/NACK | SRS |
| 12 | PUCCH without SR/ACK/NACK | PUCCH with SR/ACK/NACK |
| 13 | PUCCH without SR/ACK/NACK | PUCCH without SR/ACK/NACK |
| 14 | PUCCH without SR/ACK/NACK | PUSCH with ACK/NACK |
| 15 | PUCCH without SR/ACK/NACK | PUSCH without ACK/NACK |
| 16 | PUSCH with ACK/NACK | SRS |
| 17 | PUSCH with ACK/NACK | PUCCH with SR/ACK/NACK |
| 18 | PUSCH with ACK/NACK | PUCCH without SR/ACK/NACK |
| 19 | PUSCH with ACK/NACK | PUSCH with ACK/NACK |
| 20 | PUSCH with ACK/NACK | PUSCH without ACK/NACK |
| 21 | PUSCH without ACK/NACK | SRS |
| 22 | PUSCH without ACK/NACK | PUCCH with SR/ACK/NACK |
| 23 | PUSCH without ACK/NACK | PUCCH without SR/ACK/NACK |
| 24 | PUSCH without ACK/NACK | PUSCH with ACK/NACK |
| 25 | PUSCH without ACK/NACK | PUSCH without ACK/NACK |

For interpretation of Table 4, the row numbered 1 is used as an example to indicate that the SRS of the target cell may conflict with the SRS of the source cell, and the row numbered 7 is used as an example to indicate the PUCCH of the target cell for uploading SR/ACK/NACK information may conflict with the PUCCH of the source cell for uploading SR/ACK/NACK information.

Generally, a primary task of the DAPS handover is to ensure a successful handover to the target cell. Therefore, a priority of the channel of the target cell is higher than a priority of the channel of the source cell.

In a specific case, priorities of all the possible channels in conflict in Table 4 are set as follows:

1 to 5: The SRS of the target cell>all the channels of the source cell.

To be specific, a priority of the SRS of the target cell is higher than priorities of all the channels of the source cell. This can ensure a normal SRS-related function of the target cell, and also ensure link connection quality of the target cell.

6: The PUCCH with SR/ACK/NACK of the target cell>the SRS of the source cell.

To be specific, a priority of the PUCCH with SR/ACK/NACK of the target cell is higher than the priority of the SRS of the source cell. This can ensure a normal function of an important uplink control signal of the target cell, and also ensure the link connection quality of the target cell.

However, during dual connectivity, if it is found that quality of the target cell deteriorates rapidly and signal quality of the source cell is better than that of the target cell, that the priority of the PUCCH with SR/ACK/NACK of the target cell<the priority of the SRS of the source cell may alternatively be used, to ensure that the signal on the SRS of the source cell is normal. This helps improve link quality of the source cell when the handover to the target cell may fail.

7 to 10: The PUCCH with SR/ACK/NACK of the target cell>the PUCCH and the PUSCH of the source cell. This ensures the normal function of the important uplink control signal of the target cell, and also ensures the link connection quality of the target cell.

11: The PUCCH without SR/ACK/NACK of the target cell<the SRS of the source cell.

To be specific, a priority of the PUCCH without SR/ACK/NACK of the target cell is higher than the priority of the SRS of the source cell. In this way, a less important uplink control signal of the target cell may be sacrificed, but a normal SRS-related function of the source cell is ensured.

12: The PUCCH without SR/ACK/NACK of the target cell<the PUCCH with SR/ACK/NACK of the source cell.

To be specific, the priority of the PUCCH without SR/ACK/NACK of the target cell is lower than a priority of the PUCCH with SR/ACK/NACK of the source cell. This can ensure a normal function of a high-priority control channel of the source cell by sacrificing the less important uplink control signal of the target cell.

13: The PUCCH without SR/ACK/NACK of the target cell>the PUCCH without SR/ACK/NACK of the source cell.

To be specific, the priority of the PUCCH without SR/ACK/NACK of the target cell is higher than a priority of the PUCCH without SR/ACK/NACK of the source cell. In a same situation, the priority of the channel of the target cell being higher than the priority of the channel of the source cell may ensure the successful handover to the target cell.

14: The PUCCH without SR/ACK/NACK of the target cell<the PUSCH with ACK/NACK of the source cell.

The priority of the PUCCH without SR/ACK/NACK of the target cell is lower than a priority of the PUSCH with ACK/NACK of the source cell. A normal function of a PUSCH channel that is of the source cell and that includes a high-priority control signal may be ensured by sacrificing the less important uplink control signal of the target cell.

15: The PUCCH without SR/ACK/NACK of the target cell>the PUSCH without ACK/NACK of the source cell.

To be specific, the priority of the PUCCH without SR/ACK/NACK of the target cell is higher than a priority of the PUSCH without ACK/NACK of the source cell. The PUSCH of the source cell is mainly used to send a DPCP control signaling packet and is of less importance. Ensuring the PUCCH without SR/ACK/NACK of the target cell helps ensure the successful handover to the target cell.

However, during the dual connectivity, if it is found that the quality of the target cell deteriorates rapidly and the signal quality of the source cell is better than that of the target cell, that the priority of the PUCCH without SR/ACK/NACK<the priority of the PUSCH without ACK/NACK of the source cell may alternatively be used. This helps improve quality of the PUSCH channel of the source cell when the handover to the target cell may fail.

16: The PUSCH with ACK/NACK of the target cell>the SRS of the source cell.

To be specific, a priority of the PUSCH with ACK/NACK of the target cell is higher than the priority of the SRS of the source cell. This can ensure a normal function of a PUSCH channel that is of the target cell and that includes an important uplink control signal, and ensure the link connection quality of the target cell.

However, during the dual connectivity, if it is found that the quality of the target cell deteriorates rapidly and the signal quality of the source cell is better than that of the target cell, that the priority of the PUSCH with SR/ACK/NACK of the target cell<the priority of the SRS of the source cell may alternatively be used, to ensure that the signal on the SRS of the source cell is normal. This helps improve link quality of the source cell when the handover to the target cell may fail.

17 to 20: The PUSCH with ACK/NACK of the target cell>the PUCCH and the PUSCH of the source cell.

To be specific, the priority of the PUSCH with ACK/NACK of the target cell is higher than the priorities of the PUCCH and the PUSCH of the source cell. This can ensure the normal function of the PUSCH channel that is of the target cell and that includes the important uplink control signal, and ensure the link connection quality of the target cell.

21: The PUSCH without ACK/NACK of the target cell<the SRS of the source cell.

To be specific, a priority of the PUSCH without ACK/NACK of the target cell is lower than the priority of the SRS of the source cell. The normal SRS-related function of the source cell can be ensured by sacrificing a PUSCH channel that is of the target cell and that carries an uplink data service.

However, during the dual connectivity, if it is found that the quality of the source cell deteriorates rapidly and the signal quality of the target cell is better than that of the source cell, that the priority of the PUSCH without ACK/NACK of the target cell>the priority of the SRS of the source cell may alternatively be used, to ensure link quality of the target cell.

22: The PUSCH without ACK/NACK of the target cell<the PUCCH with SR/ACK/NACK of the source cell.

To be specific, the priority of the PUSCH without ACK/NACK of the target cell is lower than the priority of the PUCCH with SR/ACK/NACK of the source cell. This can ensure the normal function of the high-priority control channel of the source cell by sacrificing the PUSCH channel that is of the target cell and that carries the uplink data service.

However, during the dual connectivity, if it is found that the quality of the source cell deteriorates rapidly and the signal quality of the target cell is better than that of the source cell, that the priority of the PUSCH without ACK/NACK>the priority of the PUCCH with SR/ACK/NACK of the source cell may alternatively be used, to ensure the link quality of the target cell.

23: The PUSCH without ACK/NACK of the target cell>the PUCCH without SR/ACK/NACK of the source cell.

To be specific, the priority of the PUSCH without ACK/NACK of the target cell is higher than the priority of the PUCCH without SR/ACK/NACK of the source cell. This can ensure transmission of the uplink data service in the target cell and improve link quality of the target cell when the source cell does not include important signaling.

24: The PUSCH without ACK/NACK of the target cell<the PUSCH with ACK/NACK of the source cell.

To be specific, the priority of the PUSCH without ACK/NACK of the target cell is lower than the priority of the PUSCH with ACK/NACK of the source cell. This can ensure the normal function of the PUSCH channel that is of the source cell and that includes the high-priority control signal by sacrificing the PUSCH channel that is of the target cell and that carries the uplink data service.

However, during the dual connectivity, if it is found that the quality of the source cell deteriorates rapidly and the signal quality of the target cell is better than that of the source cell, that the priority of the PUSCH without ACK/NACK>the priority of the PUSCH with ACK/NACK of the source cell may alternatively be used, to ensure the link quality of the target cell.

25: The PUSCH without ACK/NACK of the target cell>the PUSCH without ACK/NACK of the source cell.

To be specific, the priority of the PUSCH without ACK/NACK of the target cell is higher than the priority of the PUSCH without ACK/NACK of the source cell. In a same situation, the priority of the channel of the target cell being higher than the priority of the channel of the source cell ensures the successful handover to the target cell.

The foregoing describes channel priority setting of the target cell and the source cell in the conflict area 2 phase. After the priorities are determined, similarly, if the high-priority channel conflicts with a low-priority channel, the signal on the high-priority channel is sent through the radio frequency channel, and a signal on the low-priority channel is dropped.

In this embodiment of this application, priority-based dropping processing is performed on the uplink channel conflict, to ensure the information sending integrity and the efficiency of the high-priority channel to the greatest extent. In addition, it can be learned from the foregoing channel priority determining process that the information sent on the high-priority channel is more important. In this case, priority-based dropping processing can also ensure sending of the important information, thereby reducing a channel conflict loss.

Optionally, performing optimization processing on the uplink channel conflict includes: performing simultaneous sending processing on the uplink channel conflict, where the simultaneous sending processing includes: performing time domain superposition on a signal on the uplink channel of the source cell and a signal on the uplink channel of the target cell to obtain a superposed signal, and then sending the superposed signal through one uplink radio frequency channel.

In addition to uplink channel conflict optimization performed by the priority-based dropping processing, uplink channel conflict optimization may also be performed by the simultaneous sending processing. To be specific, time domain superposition is performed on the signal on the uplink channel of the source cell and the signal on the uplink channel of the target cell to obtain the superposed signal, and then the superposed signal is sent through the uplink radio frequency channel.

Figure 7:
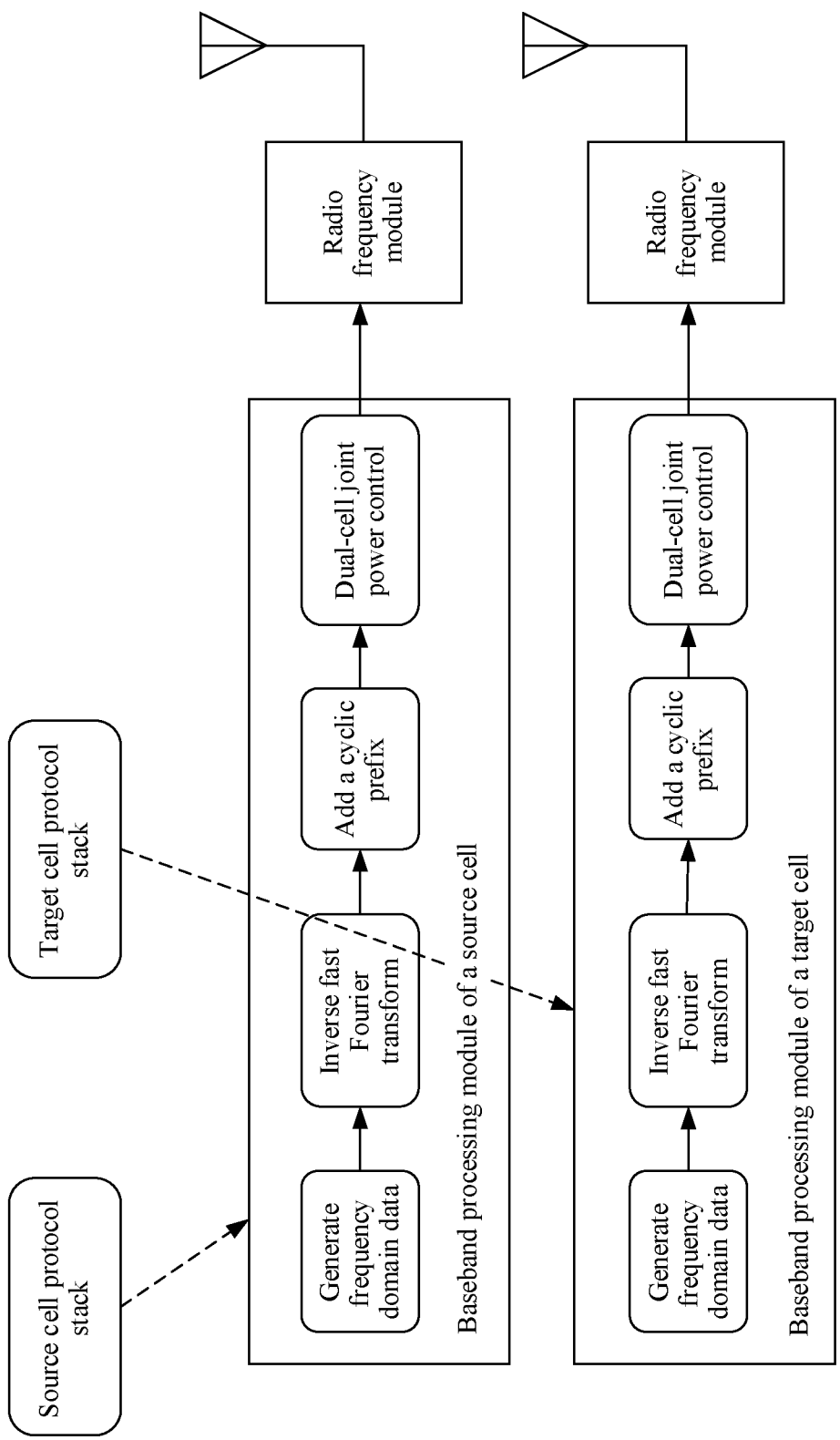
FIG. 7 is a schematic diagram of simultaneous transmission on a plurality of uplink channels according to an embodiment of the present invention.

Generally, in the intra-band non-contiguous synchronization/asynchronization and inter-band synchronization/asynchronization scenarios shown in Table 1, two BBP channels correspond to two RF channels, and signals of the source cell and the target cell may be separately sent and received through different RF channels, to support simultaneous transmission. FIG. 7 is a schematic diagram of simultaneous transmission on a plurality of uplink channels according to an embodiment of the present invention. As shown in FIG. 7, when there is a plurality of RF channels, each BBP channel may send a signal through a corresponding RF channel. There is no uplink transmit channel conflict, but a restriction on a total uplink power.

Psourcecell+Ptargetcell=Pc max, where

Psourcecell represents a transmit power of the uplink channel of the source cell, Ptargetcell represents a transmit power of the uplink channel of the target cell, and Pc max represents a total power or a maximum transmit power of the terminal device.

Therefore, a power allocation problem is a problem to be solved in the multi-RF scenario. Details are as follows:

A. Priority-Based Allocation Solution

Before power allocation, similarly, the priorities of the uplink channels of the source cell and the target cell are determined. The determining method may be as described above. A power of a high-priority uplink channel is Phighpriority, and a power of a low-priority uplink channel is Plowpriority. In this case, the following may be obtained:

Phighpriority=min(Phighpriority, Pc max); and

Plowpriority=Pc max−Phighpriority.

To be specific, it is preferentially ensured that information on the high-priority uplink channel is sent under a maximum transmit power constraint, and when there are remaining available transmit powers of the terminal device, information on the low-priority uplink channel is sent.

B. High-Priority Channel Assurance Solution

As described above, channels such as the random access-related channel, the SRS, the PUCCH with SR/ACK/NACK, and the PUSCH with ACK/NACK are high-priority channels. If transmission is simultaneously performed on the channels, a total power constraint of the terminal device is released.

Phighpriority=min(Phighpriority, Pc max); and

Plowpriority=min(Plowpriority, Pc max).

C. Performance-First Solution

During a dual connectivity period of the source cell and the target cell, a total power limit of all the channels during the period is released because dual connectivity duration is relatively short. Before power allocation, calculated uplink channel powers of the two cells are respectively Psource and Ptarget. In this case, the following may be obtained:

Psource=min(Psource, Pc max); and

Ptarget=min(Ptarget, Pc max).

In other words, regardless of the channel priority, the two channels focus on sending information.

Figure 8:
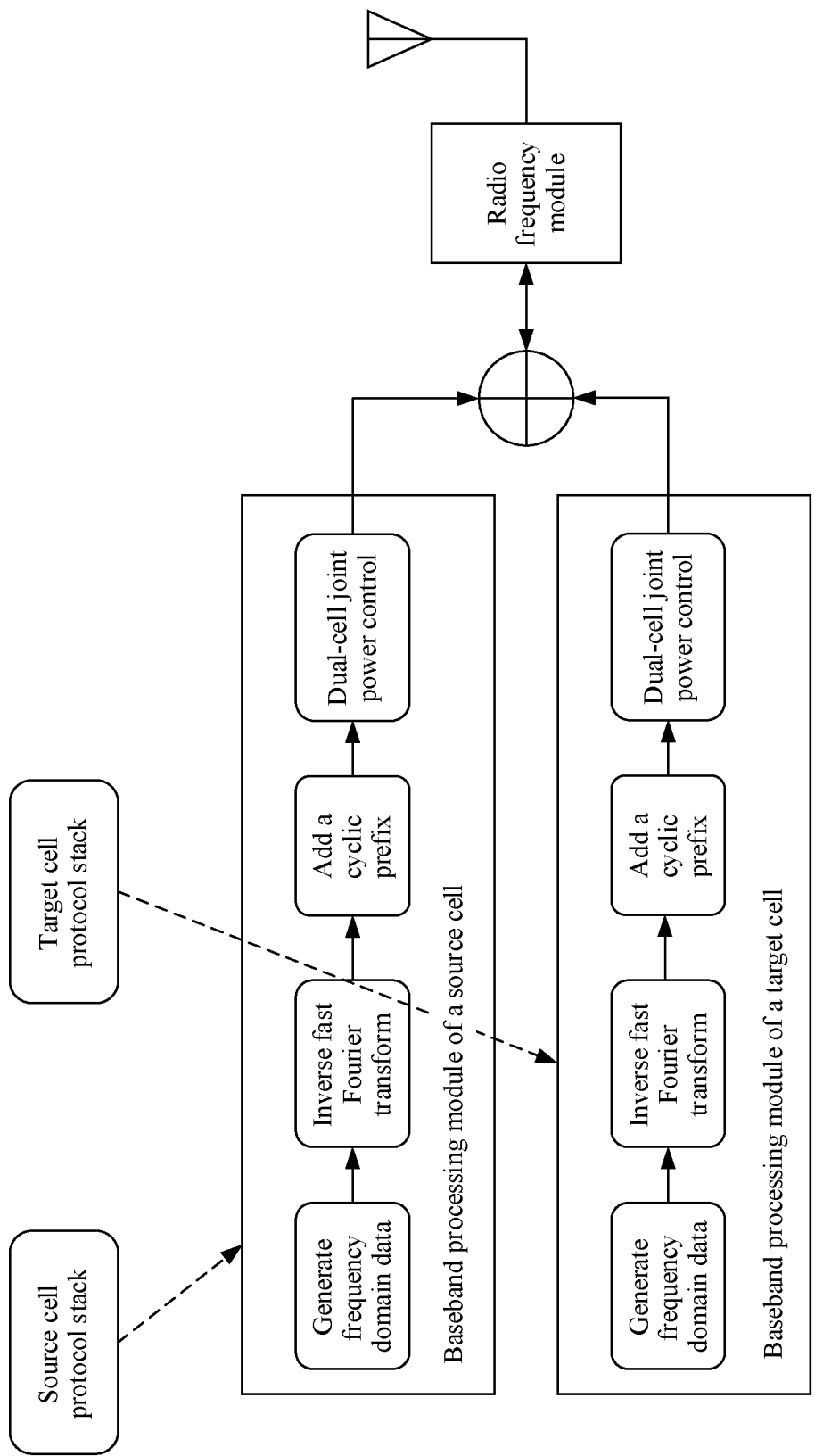
FIG. 8 is a schematic diagram in which a plurality of uplink channels are simultaneously sent through one radio frequency channel according to an embodiment of this application.

In the intra-frequency synchronization/asynchronization and intra-band contiguous inter-frequency synchronization/asynchronization scenarios described in Table 1, two BBP channels correspond to one RF channel. FIG. 8 is a schematic diagram in which a plurality of uplink channels are simultaneously sent through one radio frequency channel according to an embodiment of this application. As shown in FIG. 8, simultaneous sending processing performed in this scenario is to accumulate two channels of signals in time domain, and then send the signals together through one RF channel. The simultaneous sending processing in embodiments of this application is such a processing method.

Similarly, for the simultaneous sending processing in this scenario, the total power of the terminal device is fixed. Therefore, the simultaneous sending processing also involves the constraint on the total power Pc max of the terminal device.

Optionally, before simultaneous sending processing is performed on the uplink channel conflict, the method further includes: obtaining a first power difference between the uplink channel of the source cell and the uplink channel of the target cell through calculation, and determining that the first power difference is less than a second threshold.

First, signals on the two uplink channels are sent after being superposed in time domain. If a power difference between the two channels of signals is very large, there are many negative effects. Therefore, when the first power difference between the two uplink channels is not less than the second threshold, the simultaneous sending processing method cannot be used to resolve the uplink channel conflict, and another processing manner, for example, priority-based dropping processing, may be used. If the first power difference is less than the second threshold, further determining may be performed, to determine whether simultaneous sending processing can be performed on the uplink channel.

Superposing of two signals in time domain results in an increase of a peak to average power ratio (Peak to average power ratio, PAPR for short). The PAPR affects a linear working range of a power amplifier (Power amplifier, PA), and a maximum power reduction (Maximum Power Reduction, MPR) is introduced to resolve a PAPR problem: The terminal device is allowed to roll back specific powers in different cases (that is, an MPR value is subtracted from a total power value of the terminal device) to prevent the PA from working in a non-linear range.

Two signals with different modulations are used as examples. Compared with discrete Fourier transform spread spectrum orthogonal frequency division multiplexing (Discrete Fourier transform spread spectrum orthogonal frequency division multiplexing, DFT-s-OFDM), cyclic prefix orthogonal frequency division multiplexing (Cyclic prefix orthogonal frequency division multiplexing, CP-OFDM) has a larger PAPR, and therefore also has a larger MPR. When two time-domain channels are superposed, for example, DFT-s-OFDM channels are superposed, a PAPR obtained after the superposition is greater than a PAPR of one DFT-s-OFDM channel. Therefore, more MPRs are required.

It can be learned from the foregoing descriptions that an MPR of the terminal device may increase when signals are superposed in time domain and then sent, and that an MPR during the simultaneous sending processing is greater than or equal to an MPR during the priority-based dropping processing. A total power (denoted as Pc max_2t) of the terminal device during the simultaneous sending processing is less than a total power (denoted as Pc max_1t) of the terminal device during the priority-based dropping processing. In this case, determining processes of the actual transmit power P_highPriority_1t of the high-priority channel during the priority-based dropping processing and the actual transmit power P_highPriority_2t of the same high-priority channel during the simultaneous sending processing are respectively as follows:

P_highPriority_1t=min(Pc max_1t, P_highPriority); and
P_highPriority_2t=min(Pc max_2t, P_highPriority), where P_highPriority indicates a calculated required transmit power of the high-priority channel.

Before whether to perform simultaneous sending processing on the uplink channel conflict is determined, the priorities of the uplink channels also need to be determined. Then, an actual transmit power that can be used when the signal on the high-priority channel is sent is determined. During the simultaneous sending processing, P_highPriority_1t and P_highPriority_2t respectively indicate actual transmit powers that can be used in the cases of priority-based dropping processing and simultaneous sending processing. Generally, because the MPR during the simultaneous sending is larger, P_highPriority_1t≥P_highPriority_2t. A second power difference=P_highPriority_1t−P_highPriority_2t. When the second power difference>a third threshold, it indicates that simultaneous sending processing performed on the uplink channel conflict causes a large loss and simultaneous sending processing cannot be performed. In this case, another method, for example, priority-based dropping processing, may be used to resolve the uplink channel conflict. If the second power difference≤the third threshold, the simultaneous sending processing may be used.

Optionally, before the actual transmit power P_highPriority_2t of the high-priority channel is obtained through calculation when simultaneous sending processing is performed, the method further includes: determining an allocation manner of the superposed signal, where the allocation manner includes an almost contiguous allocation manner and a non-contiguous allocation manner, and the almost contiguous allocation manner is characterized by that, between a highest frequency and a lowest frequency in frequencies allocated to the source cell and the target cell, at least a ratio of an unallocated frequency band to a total frequency band is less than a first threshold. When the allocation manner is the almost contiguous allocation manner, a first maximum power reduction MPR 1 of the radio frequency channel is obtained, and Pc max_2t is obtained through calculation based on the MPR 1. When the allocation manner is the non-contiguous allocation manner, a second maximum power reduction MPR 2 of the radio frequency channel is obtained, and Pc max_2t is obtained through calculation based on the MPR 2.

In this embodiment of the present invention, almost contiguous allocation performed when simultaneous sending processing is performed on the channel conflict between the two cells meets at least the following:

$N_{RB\_gap}/(N_{RB\_alloc}+N_{RB\_gap})\le$ the first threshold $N_{RB\_gap}$ is a frequency band that is not allocated to either cell in the total frequency band allocated to the two cells. $N_{RB\_alloc}$ is a frequency band allocated to either of the two cells in the total frequency band allocated to the two cells. The first threshold is a to-be-determined value.

If base station scheduling meets the foregoing requirement of the almost contiguous allocation manner, the PAPR may be reduced, and performance of simultaneous transmission may be improved. During resource allocation of the base station, the PUCCH is usually fixed on some frequency resources. Through information exchange with the base station, the target cell and the source cell may learn PUCCH frequency resources of each other. Therefore, almost contiguous allocation in at least the following cases can be achieved:

the random access-related channel of the target cell and the PUCCH code channel of the source cell are allocated as adjacent as possible;

the PUCCH of the target cell and the PUSCH of the source cell are allocated as adjacent as possible; and the PUCCH of the source cell and the PUSCH of the target cell are allocated as adjacent as possible.

Figure 9:
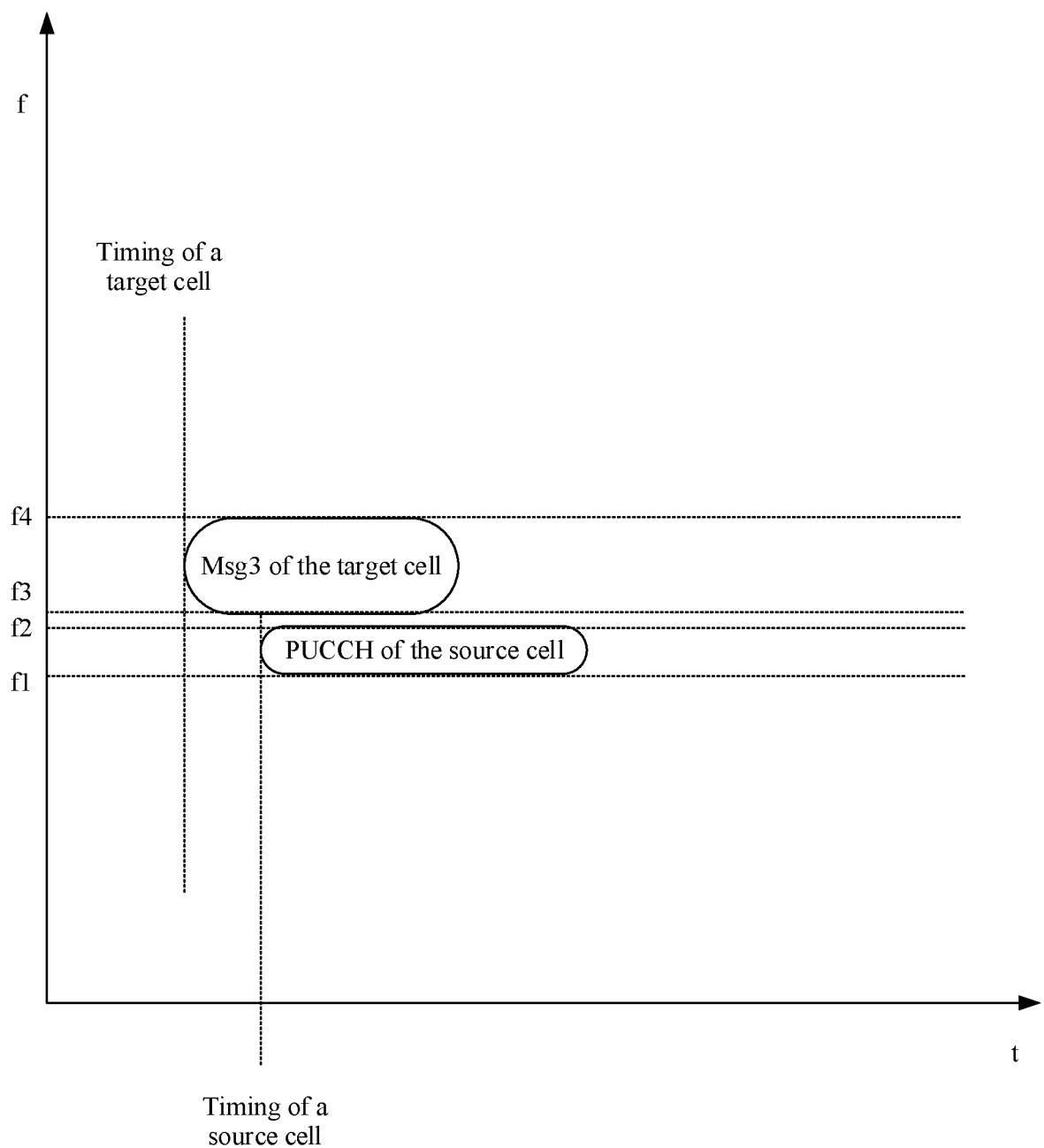
FIG. 9 is a schematic diagram of an almost contiguous allocation manner according to an embodiment of this application.

FIG. 9 is a schematic diagram of the almost contiguous allocation manner according to an embodiment of this application. As shown in FIG. 9, an interval between a frequency band allocated to the PUCCH of the source cell and a frequency band allocated to the msg3 of the target cell is very small. A lowest frequency of the PUCCH of the source cell is f1, and a highest frequency is f2. A lowest frequency of the msg3 of the target cell is f3, and a highest frequency is f4. A frequency band between f1 and f4 may be allocated in a contiguous, overlapping, or spaced manner. In FIG. 9, spaced allocation is used. The allocated frequency band $N_{RB\_alloc}=(f2-f1)+(f4-f3)$, and the unallocated frequency band $N_{RB\_gap}=f3-f2$. In this case, the following may be obtained:

$N_{RB\_gap}/(N_{RB\_alloc}+N_{RB\_gap})=(f3-f2)/((f2-f1)+(f4-f3)+(f3-f2))=(f3-f2)/(f4-f1)$; and $(f3-f2)/(f4-f1)\le$ the first threshold.

If time-frequency resources allocated when the terminal device performs time domain superposition on the source cell and the target cell meets the almost contiguous allocation requirement, the first maximum power reduction value MPR 1 of the terminal device is obtained through calculation according to a method corresponding to the almost non-contiguous allocation manner. Alternatively, if time-frequency resources allocated by the network do not meet the almost contiguous allocation requirement, the second maximum power reduction value MPR 2 of the terminal device is obtained through calculation in the non-contiguous allocation manner. Generally, the MPR 1<the MPR 2.

In the foregoing process of obtaining P_highPriority_2t through calculation, a larger MPR indicates a smaller P_highPriority_2t. As a result, the second power difference increases, and a loss of simultaneous sending processing is larger. To reduce such a loss, the almost contiguous allocation manner needs to be met as much as possible when signals on a plurality of uplink channels are superposed in time domain.

In this embodiment of this application, simultaneous sending processing is performed on the uplink channel conflict. When a code channel conflict occurs and power is rich, two channels may be simultaneously sent, and one channel of signals does not need to be dropped, to ensure integrity of sending a plurality of channels of signals.

In this embodiment of this application, when the terminal device establishes the connection relationship with the source cell, and sends the connection request to or establishes the connection relationship with the target cell, the terminal device detects whether the uplink channel conflict occurs, where the uplink channel includes the uplink channel of the source cell and the uplink channel of the target cell; and if the terminal device determines that the uplink channel conflict occurs, the terminal device performs optimization processing on the uplink channel conflict. In this process, because the terminal device initiates a connection to another cell while establishing a connection to a cell, or is simultaneously connected to two cells, a conflict may occur between uplink channels. The terminal device detects the conflict and resolves the conflict, to reduce an information loss of the uplink channels, and improve efficiency of sending information on the uplink channels.

Figure 10:
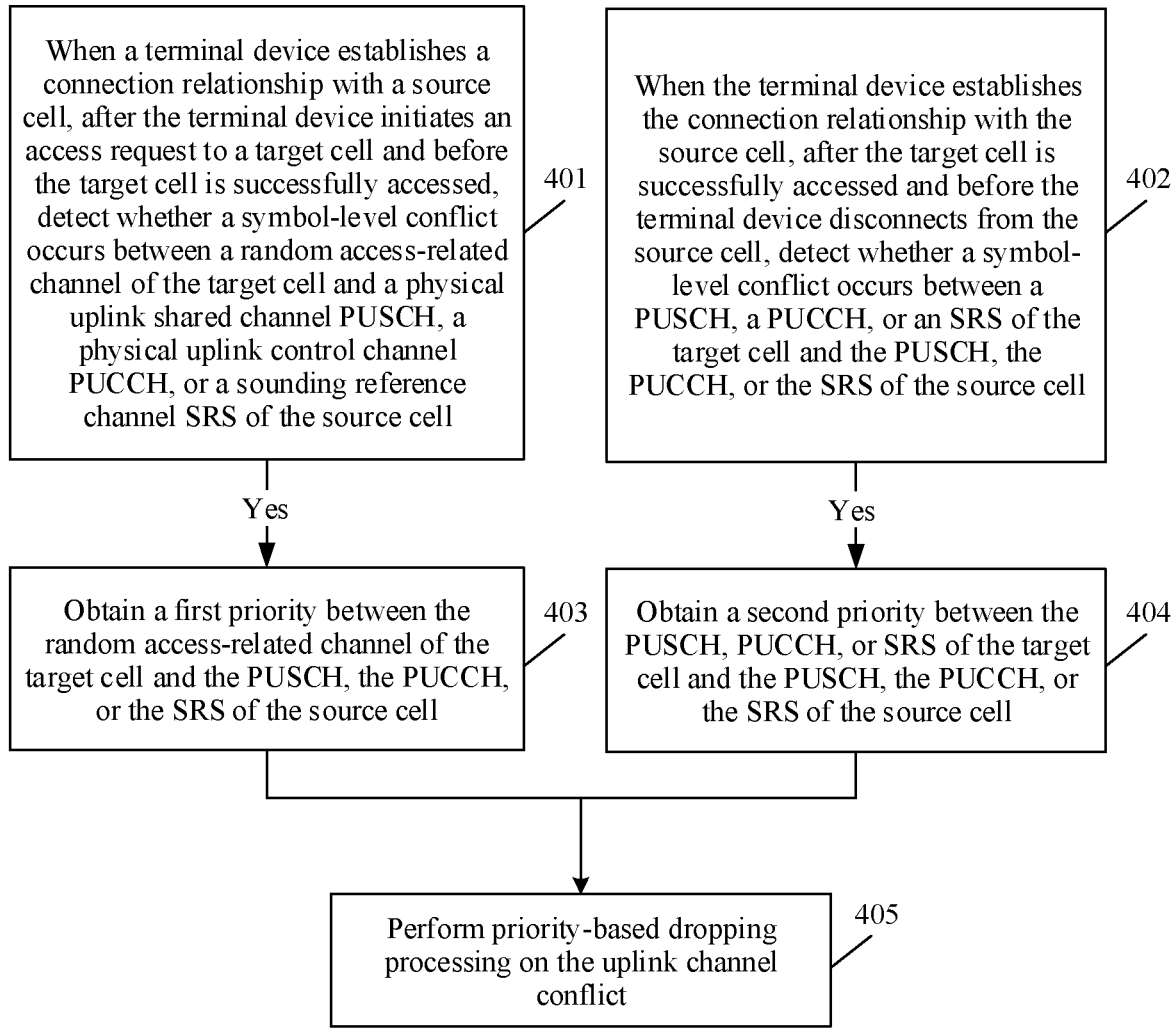
FIG. 10 is a schematic flowchart of another channel conflict processing method according to an embodiment of the present invention.

FIG. 10 is a schematic flowchart of another channel conflict processing method according to an embodiment of the present invention. As shown in FIG. 10, the method includes the following steps.

401: When a terminal device establishes a connection relationship with a source cell, after the terminal device initiates an access request to a target cell and before the target cell is successfully accessed, detect whether a symbol-level conflict occurs between a random access-related channel of the target cell and a physical uplink shared channel PUSCH, a physical uplink control channel PUCCH, or a sounding reference channel SRS of the source cell, where the random access-related channel includes a physical random access channel PRACH, a PUSCH for sending an msg3, a PUCCH for feeding back an uplink msg4 ACK/NACK, or a PUCCH or a PUSCH for sending an msgA signal; and if yes, step 403 is performed.

402: When the terminal device establishes the connection relationship with the source cell, after the target cell is successfully accessed and before the terminal device disconnects from the source cell, detect whether a symbol-level conflict occurs between a PUSCH, a PUCCH, or an SRS of the target cell and the PUSCH, the PUCCH, or the SRS of the source cell; and if yes, step 404 is performed.

Step 401 and step 402 indicate that the terminal device and the target cell are in different connection states. In this case, uplink channel conflicts that may occur between the source cell and the target cell are accordingly different. Therefore, the terminal device needs to detect different uplink channels that may conflict, and find an existing conflict.

403: Obtain a first priority between the random access-related channel of the target cell and the PUSCH, the PUCCH, or the SRS of the source cell, and perform step 405.

404: Obtain a second priority between the PUSCH, the PUCCH, or the SRS of the target cell and the PUSCH, the PUCCH, or the SRS of the source cell, and perform step 405.

Because different uplink channel conflicts correspond to different priorities, uplink channels between which a conflict occurs are processed based on different priority results, to complete final information sending.

405: Perform priority-based dropping processing on the uplink channel conflict.

For other specific descriptions of 401 to 405, refer to corresponding descriptions of the uplink conflict processing method described in steps 301 and 302, and details are not described herein again.

It can be learned that, in this embodiment of this application, priority-based dropping processing is performed on the uplink channel conflict, to ensure information sending integrity and efficiency of a high-priority channel to the greatest extent. In addition, it can be learned from the foregoing channel priority determining process that information sent on the high-priority channel is more important. In this case, priority-based dropping processing can also ensure sending of important information, thereby reducing a channel conflict loss.

Figure 11:
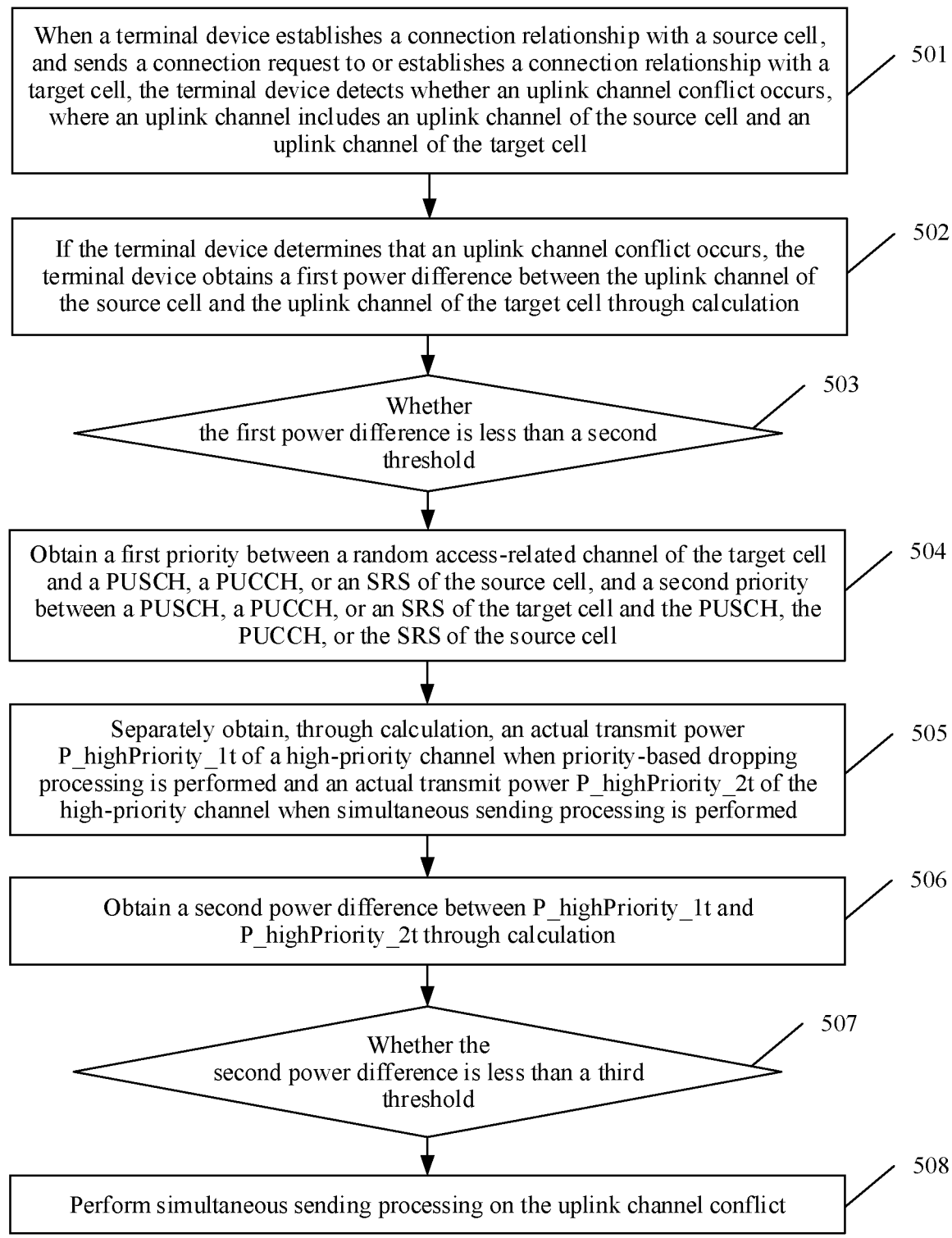
FIG. 11 is a schematic flowchart of another channel conflict processing method according to an embodiment of the present invention.

FIG. 11 is a schematic flowchart of another channel conflict processing method according to an embodiment of the present invention. As shown in FIG. 11, the method includes the following steps.

501: When a terminal device establishes a connection relationship with a source cell, and sends a connection request to or establishes a connection relationship with a target cell, the terminal device detects whether an uplink channel conflict occurs, where an uplink channel includes an uplink channel of the source cell and an uplink channel of the target cell.

502: If the terminal device determines that an uplink channel conflict occurs, the terminal device obtains a first power difference between the uplink channel of the source cell and the uplink channel of the target cell through calculation.

503: If the first power difference is less than a second threshold, step 504 is performed.

When simultaneous sending processing is performed, signals with different powers are superposed. If a power difference between two powers is very large, a channel of uplink signals with the smaller power are lost excessively, and if a channel of uplink signals with an excessive loss includes important information, a serious consequence may be caused. Therefore, first, it needs to be determined that the first power difference between the uplink channel of the source cell and the uplink channel of the target cell is less than the second threshold. Then, whether to perform simultaneous sending processing is considered.

504: Obtain a first priority between a random access-related channel of the target cell and a PUSCH, a PUCCH, or an SRS of the source cell, and a second priority between a PUSCH, a PUCCH, or an SRS of the target cell and the PUSCH, the PUCCH, or the SRS of the source cell.

505: Separately obtain, through calculation, an actual transmit power P_highPriority_1t of a high-priority channel when priority-based dropping processing is performed and an actual transmit power P_highPriority_2t of the high-priority channel when simultaneous sending processing is performed.

Similarly, during simultaneous sending processing, it may also be preferentially ensured that information on the high-priority uplink channel is sent. Therefore, the actual transmit powers corresponding to the high-priority channel in the case of simultaneous sending processing and the case of separate sending are calculated. Then, whether a signal loss on the high-priority channel is within an acceptable range is determined by calculating whether a power difference between the actual transmit power corresponding to the high-priority uplink channel in the case of separate sending and the actual transmit power of the high-priority channel in the case of simultaneous sending processing is less than a second power value, to finally determine whether to perform simultaneous sending processing.

506: Obtain a second power difference between P_highPriority_1t and P_highPriority_2t through calculation.

507: If it is determined that the second power difference is less than a third threshold, step 508 is performed.

508: Perform simultaneous sending processing on the uplink channel conflict.

For other specific descriptions of 501 to 508, refer to corresponding descriptions of the uplink conflict processing method described in steps 301 and 302, and details are not described herein again.

It can be learned that, in this embodiment of this application, simultaneous sending processing is performed on the uplink channel conflict. When a code channel conflict occurs and power is rich, two channels may be simultaneously sent, and one channel of signals does not need to be dropped, to ensure integrity of sending a plurality of channels of signals.

Figure 12:
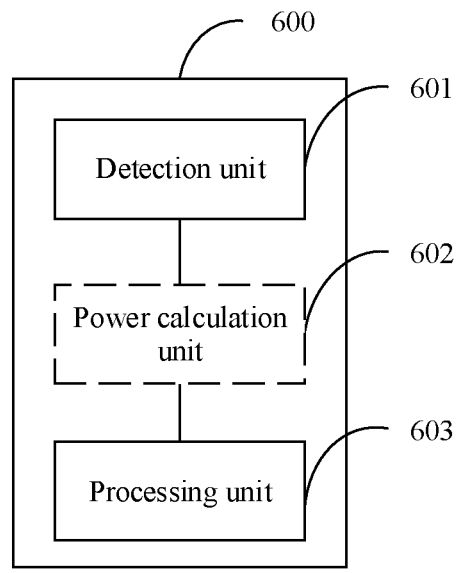
FIG. 12 is a schematic diagram of a structure of a channel conflict processing apparatus according to an embodiment of this application.

FIG. 12 is a schematic diagram of a structure of a channel conflict processing apparatus according to an embodiment of this application. As shown in FIG. 12, an apparatus 600 includes:

a detection unit 601, configured to: when the terminal device establishes a connection relationship with a source cell, and sends a connection request to or establishes a connection relationship with a target cell, detect, by the terminal device, whether an uplink channel conflict occurs, where an uplink channel includes an uplink channel of the source cell and an uplink channel of the target cell; and a processing unit 602, configured to: if the terminal device determines that an uplink channel conflict occurs, perform optimization processing on the uplink channel conflict.

In an optional example, the processing unit 602 is specifically configured to perform priority-based optimization processing on the uplink channel conflict.

In an optional example, the processing unit 602 is specifically configured to:

perform priority-based dropping processing on the uplink channel conflict, where the priority-based dropping processing includes: obtaining priorities of the uplink channel of the source cell and the uplink channel of the target cell, and sending a signal on an uplink channel with a higher priority through one uplink radio frequency channel.

In an optional example, the processing unit 602 is specifically configured to:

perform simultaneous sending processing on the uplink channel conflict, where the simultaneous sending processing includes: performing time domain superposition on a signal on the uplink channel of the source cell and a signal on the uplink channel of the target cell to obtain a superposed signal, and then sending the superposed signal through one uplink radio frequency channel.

In an optional example, the apparatus further includes a power calculation unit 603, configured to:

obtain, through calculation, a first power difference between the uplink channel of the source cell and the uplink channel of the target cell before simultaneous sending processing is performed on the uplink channel conflict; and determine that the first power difference is less than a second threshold.

In an optional example, after determining that the first power difference is less than the second threshold, the power calculation unit 603 is further configured to:

separately obtain, through calculation, an actual transmit power P_highPriority_1t of a high-priority channel when priority-based dropping processing is performed and an actual transmit power P_highPriority_2t of the high-priority channel when simultaneous sending processing is performed:

P_highPriority_1t=min(Pc max_1t, P_highPriority), and P_highPriority_2t=min(Pc max_2t, P_highPriority), where Pc max_1t is a maximum transmit power of the terminal device when priority-based dropping processing is performed, Pc max_2t is a maximum transmit power of the terminal device when simultaneous sending processing is performed, and P_highPriority is a theoretical transmit power of the high-priority channel;

obtain a second power difference between P_highPriority_1t and P_highPriority_2t through calculation; and determine that the second power difference is less than a third threshold.

In an optional example, before obtaining, through calculation, the actual transmit power P_highPriority_2t of the high-priority channel when simultaneous sending processing is performed, the power calculation unit 603 is further configured to:

determine an allocation manner of the superposed signal, where the allocation manner includes an almost contiguous allocation manner and a non-contiguous allocation manner, and the almost contiguous allocation manner is characterized by that, between a highest frequency and a lowest frequency in frequencies allocated to the source cell and the target cell, at least a ratio of an unallocated frequency band to a total frequency band is less than a first threshold; and when the allocation manner is the almost contiguous allocation manner, obtain a first maximum power reduction MPR 1 of the radio frequency channel, and obtain Pc max_2t through calculation based on the MPR 1, or when the allocation manner is the non-contiguous allocation manner, obtain a second maximum power reduction MPR 2 of the radio frequency channel, and obtain Pc max_2t through calculation based on the MPR 2.

In an optional example, the detection unit 601 is specifically configured to:

after the terminal device initiates an access request to the target cell and before the target cell is successfully accessed, detect whether a symbol-level conflict occurs between a random access-related channel of the target cell and a physical uplink shared channel PUSCH, a physical uplink control channel PUCCH, or a sounding reference channel SRS of the source cell, where the random access-related channel includes a physical random access channel PRACH, a PUSCH for sending an msg3, a PUCCH for feeding back an uplink msg4 ACK/NACK, or a PUCCH or a PUSCH for sending an msgA signal.

In an optional example, the detection unit 601 is specifically configured to:

after the target cell is successfully accessed and before the terminal device disconnects from the source cell, detect whether a symbol-level conflict occurs between a PUSCH, a PUCCH, or an SRS of the target cell and a PUSCH, a PUCCH, or an SRS of the source cell.

In an optional example, before performing priority-based optimization processing on the uplink channel conflict, the processing unit 602 is further configured to:

obtain a first priority between a random access-related channel of the target cell and a PUSCH, a PUCCH, or an SRS of the source cell, where the first priority includes that a priority of the random access-related channel of the target cell is higher than a priority of the PUSCH, the PUCCH, or the SRS of the source cell.

In an optional example, the processing unit 602 is further configured to:

avoid the SRS channel of the source cell when allocating a transmit frequency band to an msg1 or an msgA on a PRACH of the target cell.

In an optional example, before performing priority-based optimization processing on the uplink channel conflict, the processing unit 602 is further configured to:

obtain a second priority between a PUSCH, a PUCCH, or an SRS of the target cell and a PUSCH, a PUCCH, or an SRS of the source cell, where the second priority includes at least one of the following priorities:

a priority of the SRS of the target cell is higher than priorities of all uplink channels of the source cell;

a priority of a PUCCH of the target cell for sending an uplink scheduling request SR, returning an acknowledgment signal ACK, or returning a negative acknowledgment signal if an error occurs is higher than a priority of the PUCCH or the PUSCH of the source cell;

a priority of a PUCCH of the target cell for sending an SR/ACK/ACK is higher than a priority of a PUCCH of the source cell for sending information other than an SR/ACK/NACK;

a priority of a PUSCH of the target cell for sending an SR/ACK/NACK is higher than a priority of the PUCCH or the PUSCH of the source cell;

a priority of a PUSCH of the target cell for sending information other than an SR/ACK/NACK is higher than a priority of a PUSCH of the source cell for sending information other than an SR/ACK/NACK or a PUCCH of the source cell for sending the information other than the SR/ACK/NACK;

a priority of the SRS of the source cell is higher than a priority of a PUCCH of the target cell for sending information other than an SR/ACK/NACK;

a priority of a PUCCH of the source cell for sending an SR/ACK/NACK is higher than a priority of a PUCCH of the target cell for sending information other than an SR/ACK/NACK;

a priority of a PUSCH of the source cell for sending an SR/ACK/NACK is higher than a priority of a PUCCH of the target cell for sending information other than an SR/ACK/NACK; or a priority of a PUSCH of the source cell for sending information other than an SR/ACK/NACK is higher than a priority of a PUCCH of the target cell for sending information other than an SR/ACK/NACK.

It can be learned that, in this embodiment of this application, when the channel conflict processing apparatus establishes the connection relationship with the source cell, and sends the connection request to or establishes the connection relationship with the target cell, the terminal device detects whether the uplink channel conflict occurs, where the uplink channel includes the uplink channel of the source cell and the uplink channel of the target cell; and if the terminal device determines that the uplink channel conflict occurs, the terminal device performs optimization processing on the uplink channel conflict. In this process, because the terminal device initiates a connection to another cell while establishing a connection to a cell, or is simultaneously connected to two cells, a conflict may occur between uplink channels. The terminal device detects the conflict and resolves the conflict, to reduce an information loss of the uplink channels, and improve efficiency of sending information on the uplink channels.

It should be noted that the foregoing units (the detection unit 601 and the processing unit 602, or further including the power calculation unit 603) are configured to perform related steps of the foregoing methods.

In this embodiment, the apparatus 600 is presented in a form of a unit. The "unit" herein may be an application-specific integrated circuit (application-specific integrated circuit, ASIC), a processor that executes one or more software or firmware programs and a memory, an integrated logic circuit, and/or another component that can provide the foregoing functions. In addition, the detection unit 601 and the processing unit 602, or further including the power calculation unit 603, may be implemented by using a processor 701 of an apparatus 700 shown in FIG. 13.

Figure 13:
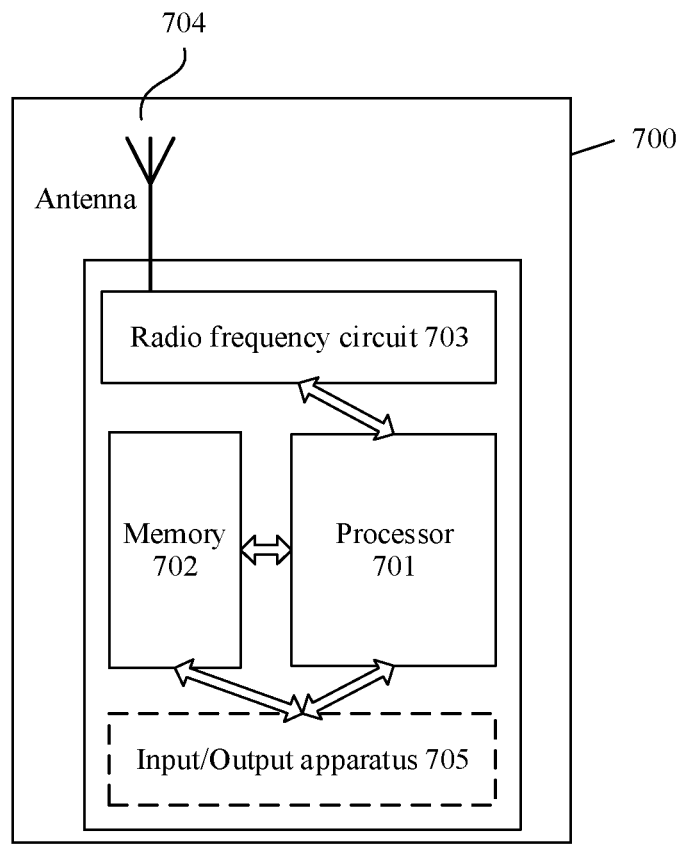
FIG. 13 is a schematic diagram of a structure of an apparatus according to an embodiment of this application.

As shown in FIG. 13, the apparatus 700 may be implemented by using a structure in FIG. 13. The apparatus 700 includes at least one processor 701, at least one memory 702, and may further include a radio frequency circuit 703, an antenna 704, and an input/output apparatus 705. The processor 701 may be configured to process a communication protocol and communication data, and may further be configured to: control the terminal device, execute software programs, process data of the software programs, and the like. The terminal device may further include a memory 702. The memory 702 is mainly configured to store the software programs and data. These programs may be loaded into the memory when the communications apparatus is delivered from a factory, or may be loaded into the memory when needed later. The radio frequency circuit 703 is mainly configured to: perform conversion between a baseband signal and a radio frequency signal, and process the radio frequency signal. The antenna 704 is mainly configured to receive and send radio frequency signals in a form of an electromagnetic wave. The input/output apparatus, for example, a touchscreen, a display, or a keyboard, is mainly configured to receive data entered by a user and output data to the user. It should be noted that some types of terminal devices may have no input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 13. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

The processor 701 may be a general-purpose central processing unit (CPU), a microprocessor, an application-specific integrated circuit (application-specific integrated circuit, ASIC), or one or more integrated circuits for controlling execution of the foregoing solution program.

The memory 702 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD- ROM), or another compact disc storage, an optical disc storage (including a compact disc, a laser disc, an optical disc, a digital versatile disc, a Blu-ray disc, or the like), a disk storage medium or another disk storage device, or any other medium that can be used to carry or store expected program code in a form of an instruction or a data structure and that can be accessed by a computer, but this is not limited herein. The memory may exist independently, and is connected to the processor through a bus. Alternatively, the memory may be integrated with the processor.

The memory 702 is configured to store application program code that executes the foregoing solutions, and the processor 701 controls the execution. The processor 701 is configured to execute the application program code stored in the memory 702.

The code stored in the memory 702 may execute the channel conflict processing method provided above. For example, when the terminal device establishes a connection relationship with a source cell, and sends a connection request to or establishes a connection relationship with a target cell, the terminal device detects whether an uplink channel conflict occurs, where an uplink channel includes an uplink channel of the source cell and an uplink channel of the target cell. If the terminal device determines that an uplink channel conflict occurs, the terminal device performs optimization processing on the uplink channel conflict. An embodiment of the present invention further provides a computer storage medium, where the computer storage medium may store a program, and when the program is executed, some or all of the steps of any data transmission rate adjustment method described in the foregoing method embodiments are performed.

It should be noted that, to make the description brief, the method embodiments are expressed as a series of actions. However, a person skilled in the art needs to know that the present invention is not limited to the described action sequence, because according to the present invention, some steps may be performed in another sequence or performed simultaneously. In addition, a person skilled in the art also needs to appreciate that all the embodiments described in the specification are example embodiments, and the related actions and modules are not necessarily mandatory to the present invention.

In the foregoing embodiments, description of the embodiments has respective focuses. For a part that is not described in detail in an embodiment, refer to related description in another embodiment.

In the several embodiments provided in this application, it should be understood that the disclosed apparatuses may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, functional units in embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present invention essentially, or the part contributing to the conventional technology, or all or some of the technical solutions may be implemented in a form of a software product. The computer software product is stored in a memory and includes several instructions for instructing a computer device (which may be a personal computer, a server, a network device, or the like) to perform all or some of the steps of the methods described in embodiments of the present invention. The foregoing memory includes any medium that can store program code, for example, a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in the embodiments may be implemented by a program instructing related hardware. The program may be stored in a computer-readable memory. The memory may include a flash memory, a read-only memory (English: Read-Only Memory, ROM for short), a random access memory (English: Random Access Memory, RAM for short), a magnetic disk, an optical disc, or the like.

Embodiments of the present invention are described in detail above. The principle and implementation of the present invention are described in this specification by using specific examples. The descriptions about the embodiments are merely provided to help understand the method and core ideas of the present invention. In addition, a person of ordinary skill in the art makes variations to the present invention in terms of the specific implementations and application scopes based on the ideas of the present invention. Therefore, the content of this specification shall not be construed as a limitation on the present invention.

What is claimed is:

1. A channel conflict processing method performed in a dual active protocol stack based (DAPS-based) handover process, wherein the method comprises:
    determining, by a terminal device before the terminal device successfully accesses a target cell, that a symbol-level conflict occurs between an uplink channel of a source cell and an uplink channel of the target cell, wherein the source cell and the target cell are intra-frequency or intra- band contiguous inter-frequency, and the terminal device uses two baseband processing (BBP) apparatuses, corresponding to a same radio frequency (RF) processing apparatus, to communicate with the source cell and the target cell; and
    in response to determining that the symbol-level conflict occurs between the uplink channel of the source cell and the uplink channel of the target cell, sending, by the terminal device, a signal on an uplink channel with a higher priority in the uplink channel of the source cell and the uplink channel of the target cell, wherein the uplink channel of the source cell comprises a physical uplink shared channel (PUSCH), a physical uplink control channel (PUCCH), or a sounding reference channel, and the uplink channel of the target cell is a random access-related channel.

2. The method according to claim 1, wherein the random access-related channel comprises a physical random access channel (PRACH), a PUSCH for sending a message msg3, a PUCCH for feeding back an uplink msg4 acknowledgment (ACK) or negative acknowledgment (NACK), or a PUCCH or PUSCH for sending an msgA signal.

3. The method according to claim 2, wherein a priority of the PRACH of the target cell is higher than a priority of the PUSCH, the PUCCH, or the sounding reference channel of the source cell.

4. The method according to claim 1, wherein the symbol-level conflict comprises that signals sending on the uplink channels of the source cell and the target cell overlap in time domain.

5. The method according to claim 1, wherein the method further comprises:
obtaining a first power difference between the uplink channel of the source cell and the uplink channel of the target cell through calculation; and
determining that the first power difference is less than a second threshold.

6. The method according to claim 5, wherein after the determining that the first power difference is less than a second threshold, the method further comprises:
separately obtaining, through calculation, an actual transmit power P_highPriority_1t of a high-priority channel when priority-based dropping processing is performed and an actual transmit power P_highPriority_2t of the high-priority channel when simultaneous sending processing is performed:
P_highPriority_1t=min(Pc max_1t, P_highPriority), and P_highPriority_2t=min(Pc max_2t, P_highPriority), wherein
Pc max_1t is a maximum transmit power of the terminal device when priority-based dropping processing is performed, Pc max_2t is a maximum transmit power of the terminal device when simultaneous sending processing is performed, and P_highPriority is a theoretical transmit power of the high-priority channel;
obtaining a second power difference between P_highPriority_1t and P_highPriority_2t through calculation; and
determining that the second power difference is less than a third threshold.

7. A channel conflict processing apparatus in a dual active protocol stack based (DAPS-based) handover process, wherein the apparatus comprises: at least one processor, and one or more memories coupled to the at least one processor and storing programming instructions for execution by the at least one processor to perform operations comprising:
determining, before a terminal device successfully accesses a target cell, that a symbol-level conflict occurs between an uplink channel of a source cell and an uplink channel of the target cell, wherein the source cell and the target cell are intra-frequency or intra-band contiguous inter-frequency, and the terminal device uses two baseband processing (BBP) apparatuses, corresponding to a same radio frequency (RF) processing apparatus, to communicate with the source cell and the target cell; and
in response to determining that the symbol-level conflict occurs between the uplink channel of the source cell and the uplink channel of the target cell, sending a signal on an uplink channel with a higher priority in the uplink channel of the source cell and the uplink channel of the target cell, wherein the uplink channel of the source cell comprises a physical uplink shared channel (PUSCH), a physical uplink control channel (PUCCH), or a sounding reference channel, and the uplink channel of the target cell is a random access-related channel.

8. The apparatus according to claim 7, wherein the random access-related channel comprises a physical random access channel (PRACH), a PUSCH for sending a message msg3, a PUCCH for feeding back an uplink msg4 acknowledgment (ACK) or negative acknowledgment (NACK), or a PUCCH or PUSCH for sending an msgA signal.

9. The apparatus according to claim 8, wherein a priority of the PRACH of the target cell is higher than a priority of the PUSCH, the PUCCH, or the sounding reference channel of the source cell.

10. The apparatus according to claim 7, wherein the symbol-level conflict comprises that signals sending on the uplink channels of the source cell and the target cell overlap in time domain.

11. The apparatus according to claim 7, wherein the operations comprise:
obtaining, through calculation, a first power difference between the uplink channel of the source cell and the uplink channel of the target cell before simultaneous sending processing is performed on the symbol-level conflict; and
determining that the first power difference is less than a second threshold.

12. The apparatus according to claim 11, wherein the operations comprise:
after determining that the first power difference is less than the second threshold,
separately obtaining, through calculation, an actual transmit power P_highPriority_1t of a high-priority channel when priority-based dropping processing is performed and an actual transmit power P_highPriority_2t of the high-priority channel when simultaneous sending processing is performed:
P_highPriority_1t=min(Pc max_1t, P_highPriority), and P_highPriority_2t=min(Pc max_2t, P_highPriority), wherein
Pc max_1t is a maximum transmit power of the terminal device when priority-based dropping processing is performed, Pc max_2t is a maximum transmit power of the terminal device when simultaneous sending processing is performed, and P_highPriority is a theoretical transmit power of the high-priority channel;
obtaining, through calculation, a second power difference between P_highPriority_1t and P_highPriority_2t; and
determining that the second power difference is less than a third threshold.

13. The apparatus according to claim 7, wherein the apparatus is a chip or the terminal device.

14. A non-transitory computer-readable storage medium, wherein the computer-readable storage medium stores computer-readable instructions, and when the computer-readable instructions are run on a communications apparatus in a dual active protocol stack based (DAPS-based) handover process, the communications apparatus is enabled to perform operations comprising:
determining, before a terminal device successfully accesses a target cell, that a symbol-level conflict occurs between an uplink channel of a source cell and an uplink channel of the target cell, wherein the source cell and the target cell are intra-frequency or intra-band contiguous inter-frequency, and the terminal device uses two baseband processing (BBP) apparatuses, corresponding to a same radio frequency (RF) processing apparatus, to communicate with the source cell and the target cell; and in response to determining that the symbol-level conflict occurs between the uplink channel of the source cell and the uplink channel of the target cell, sending a signal on an uplink channel with a higher priority in the uplink channel of the source cell and the uplink channel of the target cell, wherein the uplink channel of the source cell comprises a physical uplink shared channel (PUSCH), a physical uplink control channel (PUCCH), or a sounding reference channel, and the uplink channel of the target cell is a random access-related channel.

15. The non-transitory computer-readable storage medium according to claim 14, wherein the random access-related channel comprises a physical random access channel (PRACH), a PUSCH for sending a message msg3, a PUCCH for feeding back an uplink msg4 acknowledgment (ACK) or negative acknowledgment (NACK), or a PUCCH or PUSCH for sending an msgA signal.

16. The non-transitory computer-readable storage medium according to claim 15, wherein a priority of the PRACH of the target cell is higher than a priority of the PUSCH, the PUCCH, or the sounding reference channel of the source cell.

17. The non-transitory computer-readable storage medium according to claim 14, wherein the symbol-level conflict comprises that signals sending on the uplink channels of the source cell and the target cell overlap in time domain.

18. The non-transitory computer-readable storage medium according to claim 14, wherein the operations comprise:

obtaining a first power difference between the uplink channel of the source cell and the uplink channel of the target cell through calculation; and determining that the first power difference is less than a second threshold.

19. The non-transitory computer-readable storage medium according to claim 18, wherein after the determining that the first power difference is less than a second threshold, the operations comprise:

separately obtaining, through calculation, an actual transmit power P_highPriority_1t of a high-priority channel when priority-based dropping processing is performed and an actual transmit power P_highPriority_2t of the high-priority channel when simultaneous sending processing is performed:

P_highPriority_1t=min(Pc max_1t, P_highPriority), and
P_highPriority_2t=min(Pc max_2t, P_highPriority), wherein Pc max_1t is a maximum transmit power of the terminal device when priority-based dropping processing is performed, Pc max_2t is a maximum transmit power of the terminal device when simultaneous sending processing is performed, and P_highPriority is a theoretical transmit power of the high-priority channel;

obtaining a second power difference between P_highPriority_1t and P_highPriority_2t through calculation; and determining that the second power difference is less than a third threshold.

20. The non-transitory computer-readable storage medium according to claim 14, wherein the communications apparatus is a chip or the terminal device.

* * * * *

UNITED STATES PATENT AND TRADEMARK OFFICE
CERTIFICATE OF CORRECTION

PATENT NO. : 12,382,514 B2
APPLICATION NO. : 17/706424
DATED : August 5, 2025
INVENTOR(S) : Yan Chen et al.

Page 1 of 2

It is certified that error appears in the above-identified patent and that said Letters Patent is hereby corrected as shown below:

On the Title Page

In Column 2 (item (57), Abstract), In Line 9, Delete "infra-frequency" and insert -- intra-frequency --.

In the Claims

In Column 30, In Line 57, In Claim 1, delete "intra- band" and insert -- intra-band --.

In Column 31, In Line 36, In Claim 6, delete "(Pc max_1t," and insert -- (Pcmax_1t, --.

In Column 31, In Line 37, In Claim 6, delete "(Pc max_2t," and insert -- (Pcmax_2t, --.

In Column 31, In Line 39, In Claim 6, delete "Pc max_1t" and insert -- Pcmax_1t --.

In Column 31, In Line 41, In Claim 6, delete "Pc max_2t" and insert -- Pcmax_2t --.

In Column 32, In Line 42, In Claim 12, delete "(Pc max_1t," and insert -- (Pcmax_1t, --.

In Column 32, In Line 43, In Claim 12, delete "(Pc max_2t," and insert -- (Pcmax_2t, --.

In Column 32, In Line 45, In Claim 12, delete "Pc max_1t" and insert -- Pcmax_1t --.

In Column 32, In Line 47, In Claim 12, delete "Pc max_2t" and insert -- Pcmax_2t --.

In Column 34, In Line 17 (Approx.), In Claim 19, delete "(Pc max_1t," and insert -- (Pcmax_1t, --.

In Column 34, In Line 18 (Approx.), In Claim 19, delete "(Pc max_2t," and insert -- (Pcmax_2t, --.

Signed and Sealed this
Tenth Day of February, 2026

John A. Squires
*Director of the United States Patent and Trademark Office*

CERTIFICATE OF CORRECTION (continued)
U.S. Pat. No. 12,382,514 B2

In Column 34, In Line 20, In Claim 19, delete "Pc max_1t" and insert -- Pcmax_1t --.

In Column 34, In Line 22, In Claim 19, delete "Pc max_2t" and insert -- Pcmax_2t --.